US010816565B2

(12) United States Patent
Doran et al.

(10) Patent No.: US 10,816,565 B2
(45) Date of Patent: Oct. 27, 2020

(54) TEST TUBE REMOVAL DEVICE AND SYSTEM

(71) Applicant: Michael Doran, Westerville, OH (US)

(72) Inventors: Michael Doran, Westerville, OH (US); Steve Sauer, Columbus, OH (US); Jacob Tesmer, Columbus, OH (US); Colin Hearon, Columbus, OH (US)

(73) Assignee: Michael Doran, Westerville, OH (US)

( * ) Notice: Subject to any disclaimer, the term of this patent is extended or adjusted under 35 U.S.C. 154(b) by 0 days.

(21) Appl. No.: 16/215,537

(22) Filed: Dec. 10, 2018

(65) Prior Publication Data

US 2019/0346474 A1 Nov. 14, 2019

Related U.S. Application Data

(60) Provisional application No. 62/596,164, filed on Dec. 8, 2017.

(51) Int. Cl.
*G01N 35/10* (2006.01)
*B01L 9/06* (2006.01)

(52) U.S. Cl.
CPC ............. *G01N 35/10* (2013.01); *B01L 9/06* (2013.01); *B01L 2200/04* (2013.01); *B01L 2300/0809* (2013.01); *B01L 2300/0858* (2013.01)

(58) Field of Classification Search
CPC ... G01N 35/10; B01L 9/06; B01L 2300/0809; B01L 2300/0858; B01L 2200/04
See application file for complete search history.

(56) References Cited

U.S. PATENT DOCUMENTS

| 3,154,225 A | 10/1964 | Wadlinger et al. |
| 3,375,934 A | 4/1968 | Bates |

(Continued)

*Primary Examiner* — Jonathan M Dunlap
(74) *Attorney, Agent, or Firm* — Miracle IP; Bryce D. Miracle

(57) ABSTRACT

A device and system for extracting simultaneously a plurality of test tubes from one or more aligned racks is provided. The device is operably adapted to extract test tubes having a body with a first diameter and a top portion with a lip having a second larger diameter. The aligned racks generally form collectively a rectangular footprint and provide opposing longitudinal shoulders. A version of the device generally includes an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row; a frame housing adapted to couple with the one or more racks, the frame housing including at least a first biasing surface; and a cam assembly operably attached to the extraction assembly for moving the extraction assembly between a first position and a raised position, the cam assembly including at least a first cam operably positioned proximate the first biasing surface and a lever operably attached to the first cam for providing rotary motion which translates to linear upward motion of the extraction assembly while moving from the first position to the raised position.

19 Claims, 19 Drawing Sheets

(56) References Cited

U.S. PATENT DOCUMENTS

| | | | |
|---|---|---|---|
| 3,483,997 A | 12/1969 | Ritter | |
| 3,643,812 A | 2/1972 | Mander | |
| 4,284,603 A | 8/1981 | Korom | |
| 4,287,154 A | 9/1981 | Sommers | |
| 4,495,150 A | 1/1985 | Cook | |
| 5,313,858 A | 5/1994 | Stitt | |
| 5,651,941 A | 7/1997 | Stark | |
| 6,132,684 A | 10/2000 | Marino | |
| 6,197,261 B1 | 3/2001 | Linville | |
| 7,132,082 B2 | 11/2006 | Aviles | |
| 7,232,038 B2 | 6/2007 | Whitney | |
| 8,182,763 B2 * | 5/2012 | Duffy | F16K 99/0032 422/500 |
| 8,580,195 B2 | 11/2013 | Frey | |
| 9,701,957 B2 * | 7/2017 | Wilson | C12N 15/1013 |
| 2009/0065458 A1 | 3/2009 | Murray | |

* cited by examiner

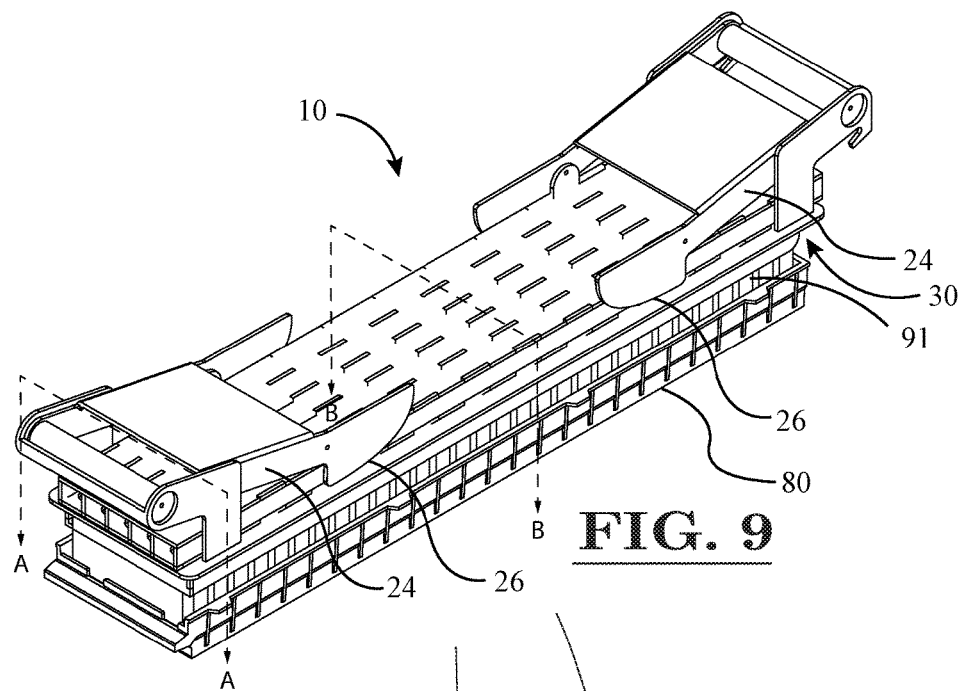
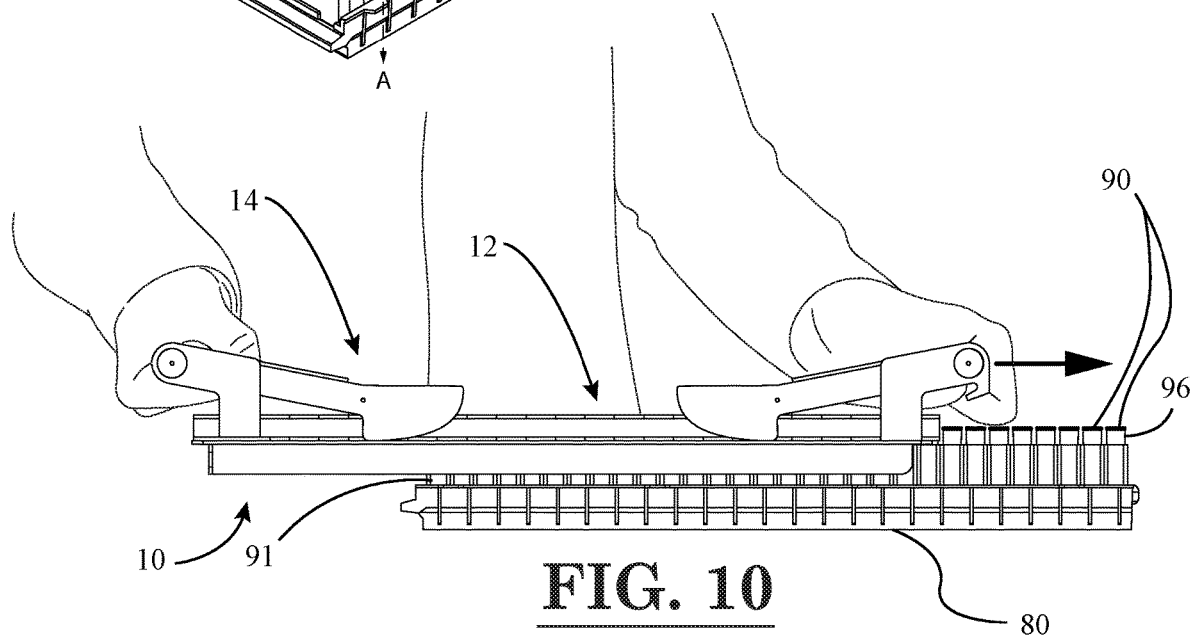

Section View A-A

Vertical Position needed for test tubes to overcome spring pressure retaining them in slots Section View B-B

SECTION A - A

TEST TUBE REMOVAL DEVICE AND SYSTEM

CROSS-REFERENCE TO RELATED APPLICATION

This application is based upon and claims the priority filing date of the previously filed, U.S. Provisional patent application entitled "TEST TUBE REMOVAL DEVICE" filed Dec. 8, 2017, Ser. No. 62/596,164, the entire disclosure of which is hereby incorporated herein by reference.

FIELD OF THE INVENTION

The present invention relates to the field of test sample analysis test tube transport, particularly a device and system for removing a plurality of utilized test tubes from a plurality of racks aligned in a tray.

BACKGROUND

Test tubes are widely utilized in labs for handling, testing, and analysis of serum containing biological or other fluid materials. Test tubes in the laboratory testing setting are typically made of clear disposable plastic to be discarded after use thereof. The top of some test tube often features a flared lip to aid pouring out the contents therein.

In laboratories, such as for example clinical laboratories in which patient samples are examined and submitted to various in-vitro diagnosis tests, test tubes containing samples (such as blood, urine, etc.) have to be handled in high number and in a cautious but still efficient manner. For years now, automated procedures with corresponding systems and devices have been used in this context.

For efficient handling purposes, the tubes are not handled individually but placed in storage racks or cassettes. For example, the racks are configured to seat at least five upright aligned sample tubes to be tested by an analyzer or laboratory testing machine. Each rack comprises a circular slot having a means for gripping the respective test tube seated therein. For example, most rack slots have one or more retention springs for retaining the respective tube within the slot.

In preparation for testing by an analyzer, the racks are usually placed on rack carriers called trays for further processing such as handling, transporting, and discharging. Typically rack carriers are configured to carry a plurality of racks which together form a plurality of longitudinal rows and lateral columns of sample tubes forming a rectangular footprint. Ideally, each tray can properly hold thirty (30) racks seating five (5) test tubes—providing a total of 150 tubes amongst the array. Thus, a typical tray would contain five (5) longitudinal rows and thirty (30) lateral columns of sample test tubes. Manual handling of the trays, especially charging/discharging of storage racks, becomes difficult when a high number of trays must be handled.

More specifically, the discharging or removal of contaminated test tubes from the racks within a tray can be tedious, time consuming, and hazardous if certain precautions are not taken to avoid contact with residual sample material residing in the tubes. Typically, a lab technician must load the tray with the plurality of racks containing a plurality of test tubes and then individually remove each sample tube by hand and discard each tube into a designated biohazard receptacle. Thereafter, the empty racks must be flipped over individually and repositioned back in the tray. Then, the inverted racks are loaded onto a standard analyzer tray. This process can take upwards of 2 minutes and 15 seconds to clear a myriad of test tubes from a standard sized tray having a plurality of racks. Thus, unnecessarily wasting the time of the technician and substantially increasing the entire amount of time required from charging, testing, to discharge of each sample test tube.

For the foregoing reasons, there is a need for an improved device which helps to assist in the removal of test sample tubes from racks and trays.

SUMMARY

In accordance with the invention, a device and system for extracting simultaneously a plurality of test tubes from one or more aligned racks is provided. The device is operably adapted to extract test tubes having a body with a first diameter and a top portion with a lip having a second larger diameter. The aligned racks generally form collectively a rectangular footprint and provide opposing longitudinal shoulders. A version of the device generally comprises: (a) an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row; (b) a frame housing adapted to couple with the one or more racks, the frame housing including at least a first biasing surface; and (c) a cam assembly operably attached to the extraction assembly for moving the extraction assembly between a first position and a raised position, the cam assembly including at least a first cam operably positioned proximate the first biasing surface and a lever operably attached to the first cam for providing rotary motion which translates to linear upward motion of the extraction assembly while moving from the first position to the raised position.

In a certain version of the invention, a first handle is attached to the lever, wherein as the handle is caused to move upward, the cam is operably rotated and biased against the surface, thereby moving the extraction assembly from the first position to the raised position.

In another version of the application, a first and second static handles are positioned at each opposing end of the frame housing.

In a version, at least one of the first and second static handles is adapted to nest and limit the path of motion of the movable handle while in the first position.

In yet another version, the first and second static handles are disposed longitudinally outward beyond the perimeter the frame housing.

In certain versions, the frame housing is formed of a rectangular framework open at a first end, the rectangular framework sized to receive and seat with the opposing longitudinal shoulders formed by the one or more aligned racks.

In a detailed version of the application, the device comprises (a) an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row; (b) a frame housing adapted to couple with the one or more racks, the frame housing including a first and second opposing laterally parallel biasing surfaces; and (c) a cam assembly operably attached to the extraction assembly for moving the extraction assembly between a first position and a raised position, the cam assembly including a first pair of laterally disposed cams and a second pair of laterally disposed cams, the first pair and the second pair of laterally disposed cams are rotatably attached at opposing sides of the extraction assembly, each pair of cams operably proximate with the first and second biasing surfaces respectively, a first and second pair of levers operably attached to the first and second pair of cams respectively providing rotary motion which translates to linear upward motion of the extraction assembly while moving from the first position to the raised position, and a first and second movable handle attaching each of the pair of levers together for providing uniform motion of each pair of cams between the first position and the raised position.

The previous example version may include a first and second static handles positioned at each opposing ends of the frame housing, wherein the first and second static handles are disposed longitudinally outward beyond the perimeter of the frame housing.

In some versions, each of the first and second static handles are adapted to nest and limit the path of motion of the first and second movable handles respectively while in the first position. Moreover, in some versions the first and second movable handles are disposed longitudinally outward with respect to the extraction assembly, wherein as the handles are caused to move upward, the respective cam pairs are uniformly rotated and biased against the respective surfaces, thereby moving the extraction assembly from the first position to the raised position.

A version of the application includes a system for extracting and disposing of a plurality of test tubes from one or more aligned racks having opposing longitudinal shoulders and form together one or more longitudinal rows of aligned test tubes, the test tubes having a top portion having a lip having a diameter and a body having a diameter. Generally, a version of the system may include a device comprising: (a) an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row; (b) a frame housing adapted to couple with the one or more racks, the frame housing including at least a first biasing surface; and (c) a cam assembly operably attached to the extraction assembly for moving the extraction assembly between a first position and a raised position, the cam assembly including at least a first cam operably positioned proximate the first biasing surface and a lever operably attached to the first cam for providing rotary motion which translates to linear upward motion of the extraction assembly while moving from the first position to the raised position; and a receptacle comprising a container for receipt and storage of discarded test tubes, the container having a top perimeter, and a funnel assembly including a front splash guard and an upper hood portion.

In a version of the system, the funnel assembly front splash guard extends upward and forward of the top perimeter and the upper hood portion extends from the rear of the container, collectively the splash guard and the upper hood form a gap for receipt and channeling of the test tubes directly from the removal device.

In other versions of the system, the upper hood further comprises a laterally extending support rod and the device further comprises a pair of laterally disposed hooks which are operably configured to latch with the lateral support rod.

In yet other versions of the system, a first and second rack carrier is provided, wherein each rack carrier comprises a flat base and opposing side walls extending upwards forming a rectangular container having a depth, wherein the depth is approximately half of the height of an upright test tube rack.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The test tube removal device and system may, however, be embodied in many different forms and should not be construed as being limited to the embodiments set forth herein; rather, these embodiments are provided by way of illustration only and so that this disclosure will be thorough, complete and fully convey understanding to those skilled in the art.

BRIEF DESCRIPTION OF THE DRAWINGS

These and other features, aspects, and advantages of the present invention will become better understood with regard to the following description and accompanying figures where:

FIG. 9 is an illustrative front perspective view showing the version shown in FIG. 1 coupled with a tray having racks and test tubes;

FIG. 10 is an illustrative front elevation view showing the version shown in FIG. 1 while in the process of engaging the racks loaded with test tubes;

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices and methods are omitted so as not to obscure the description of the present invention with unnecessary detail.

Moreover, the description is not to be taken in the limiting sense but is made merely for the purpose of illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Initially with reference to FIG. 1-FIG. 7, a description of a version of the invention will be provided and is generally designated as numeral 10. Generally, the application is directed towards a test tube removal device 10 for assisting lab technicians with removing test tubes 90 after analysis and testing by an analyzer or laboratory testing machine. The test tube removal device 10 is generally adapted to remove test tubes 90 in bulk by generating a simultaneous upward movement thereof.

Figure 26:
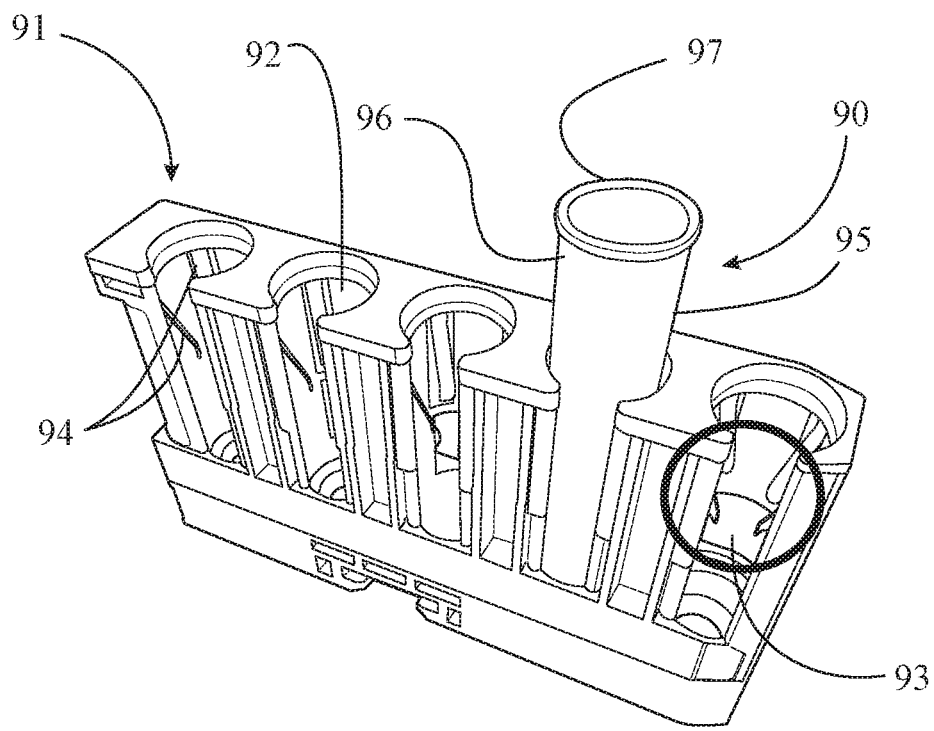
FIG. 26 is a front perspective of a standard test tube rack with emphasis on the means of retaining.

With reference to FIG. 26, the test tubes 90 are not handled individually but are placed in storage racks 91 or cassettes. For example, the racks 91 are configured to seat at least five upright aligned sample test tubes 90 to be tested by an analyzer or laboratory testing machine. Each rack 91 comprises a cylindrical slot 92 having a means for gripping 93 the respective test tube 90 seated therein. For example, most rack slots 92 have one or more retention springs 93 for retaining the respective tube 90 within the slot 92.

Figure 27:
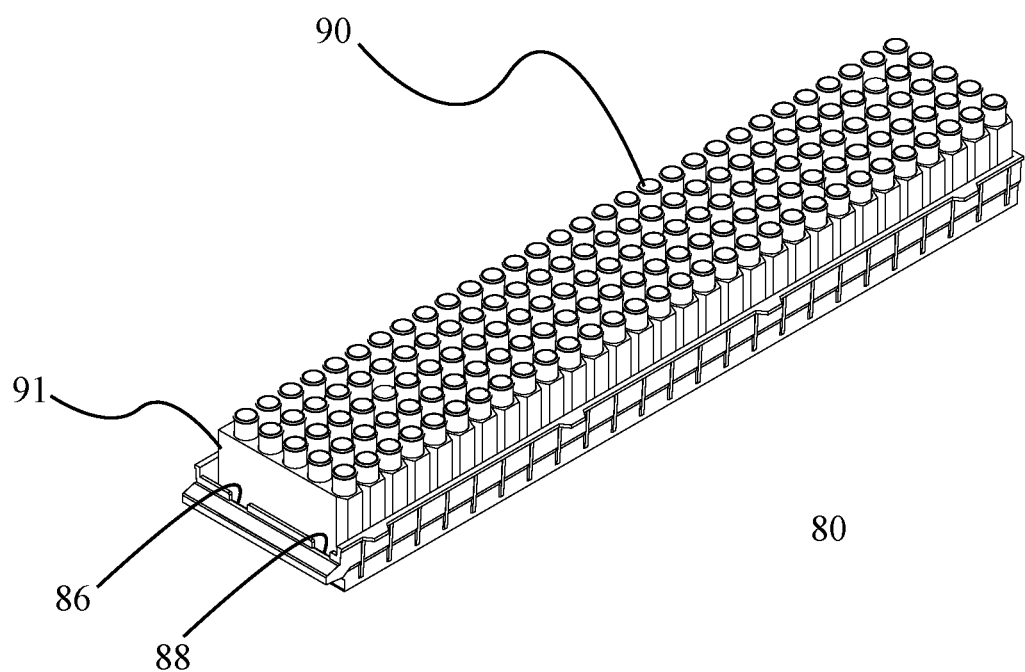
FIG. 27 is an illustrative perspective view of a tray loaded with a plurality of racks with test tubes.

As illustrated in FIG. 27, in preparation for testing by an analyzer, the racks 91 are placed on rack carriers 80 for further processing such as handling, transporting, and discharging. Typically rack carriers 80 are configured to carry a plurality of racks 91 which together form a plurality of longitudinal rows and lateral columns of sample test tubes 90 collectively forming a rectangular footprint. As shown in FIG. 27, ideally, each rack carrier 80 can properly hold thirty (30) racks seating five (5) test tubes—providing a total of 150 tubes amongst the array. Thus, a typical rack carrier 80 would contain five (5) longitudinal rows and thirty (30) lateral columns of sample test tubes. Moreover, the plurality of racks 91 each have opposing shoulders 70a, 70b which when aligned collectively form opposing longitudinal shoulders 72a, 72b forming the perimeter of the rectangular footprint (See Also FIG. 25).

By way of an improvement to existing rack carriers, a version of the application optionally includes a rack carrier 80 which is operably configured to properly hold thirty (30) traditional racks 91 having seated a plurality of test tubes 90—providing a total of 150 test tubes 90 amongst the array. Thus, preferably, the rack carrier 80 would contain five (5) longitudinal rows and thirty (30) lateral columns of sample test tubes. In a version, the rack carrier 80 comprises a flat base and four side walls extending upwards forming a rectangular container having a depth. Ideally, the depth of the tray 80 is approximately half the height of an upright rack 91.

Figure 1:
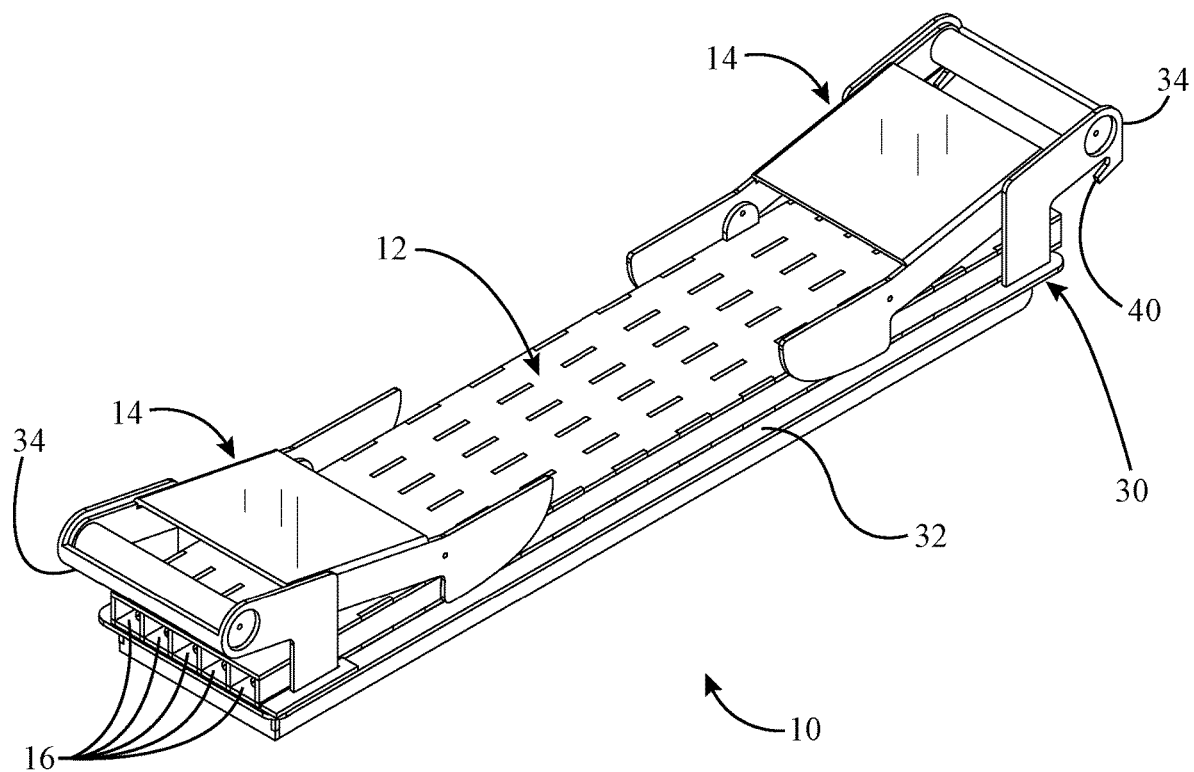
FIG. 1 is front perspective view of a version of the application.
Figure 2:
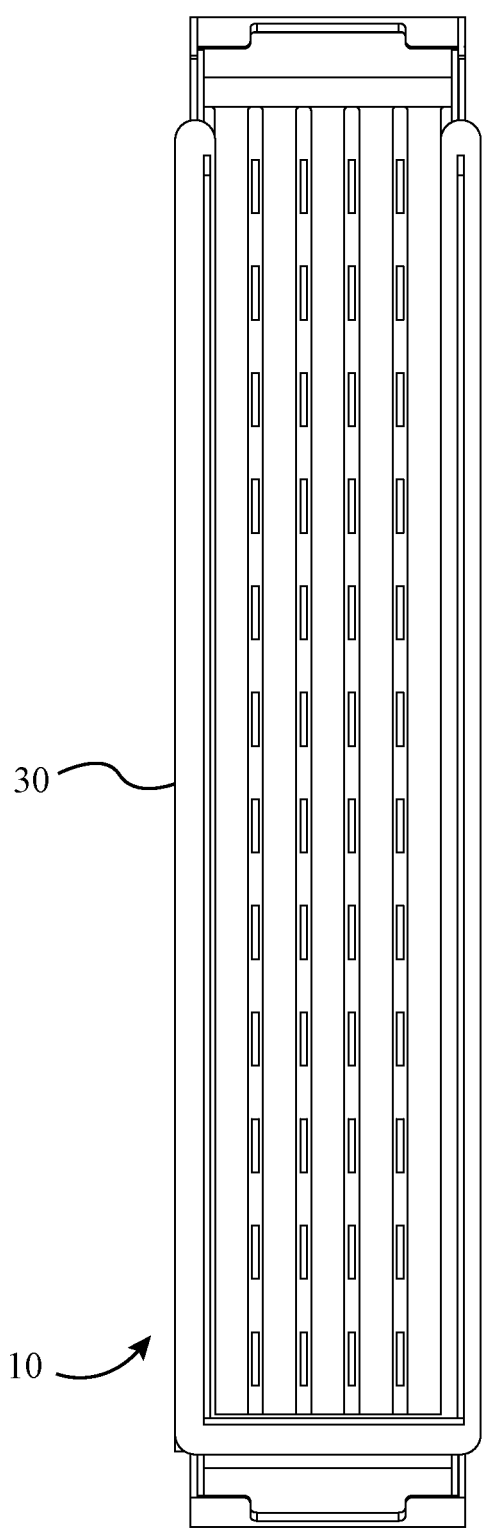
FIG. 2 is a bottom plan view of the version shown in FIG. 1.
Figure 3:
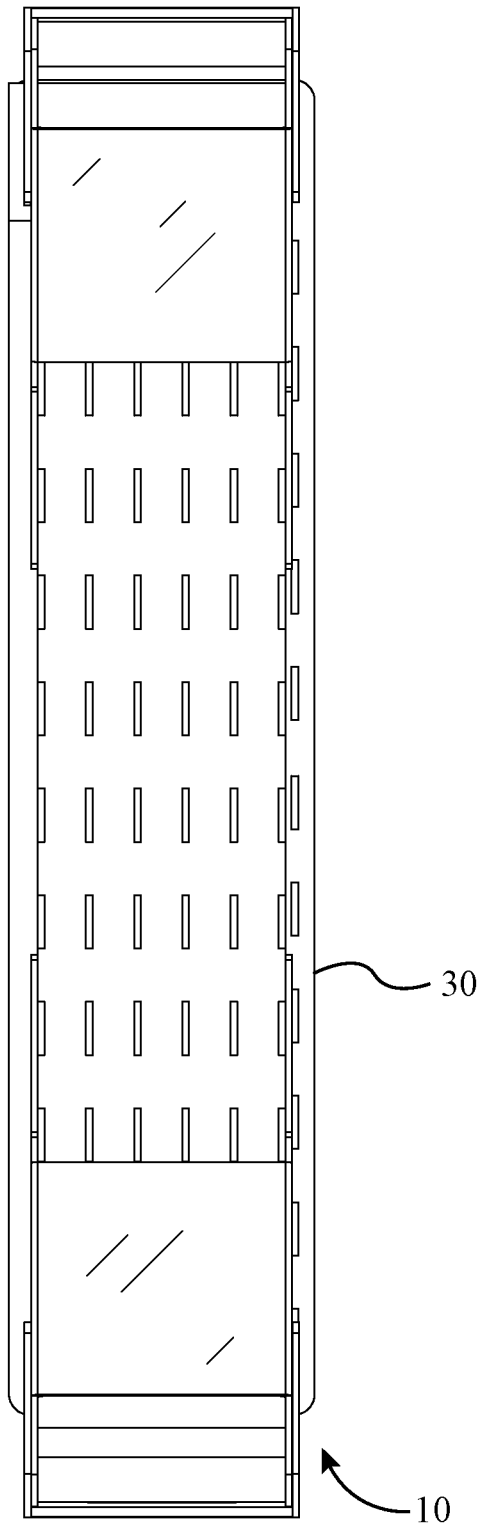
FIG. 3 is a top plan view of the version shown in FIG. 1.
Figure 4:
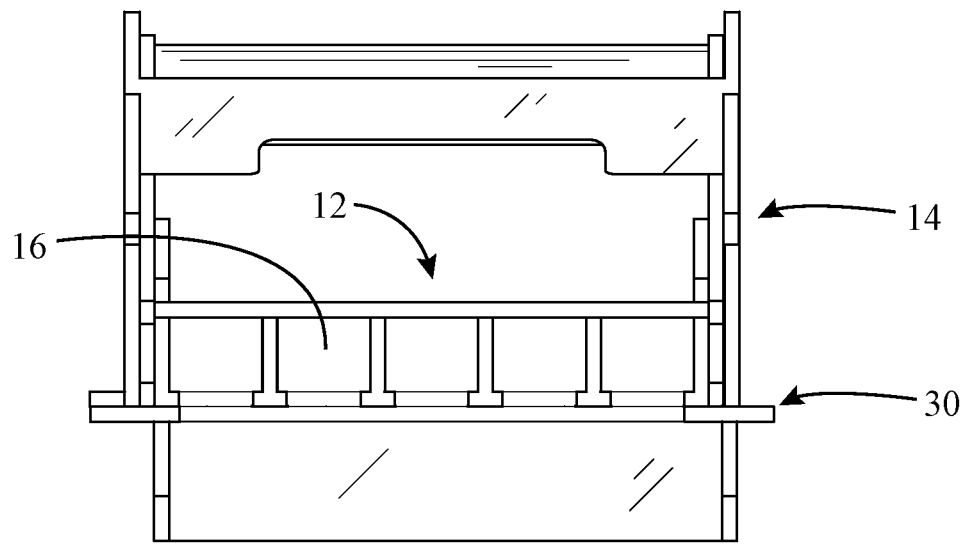
FIG. 4 is a right-side elevation view of the version shown in FIG. 1.
Figure 5:
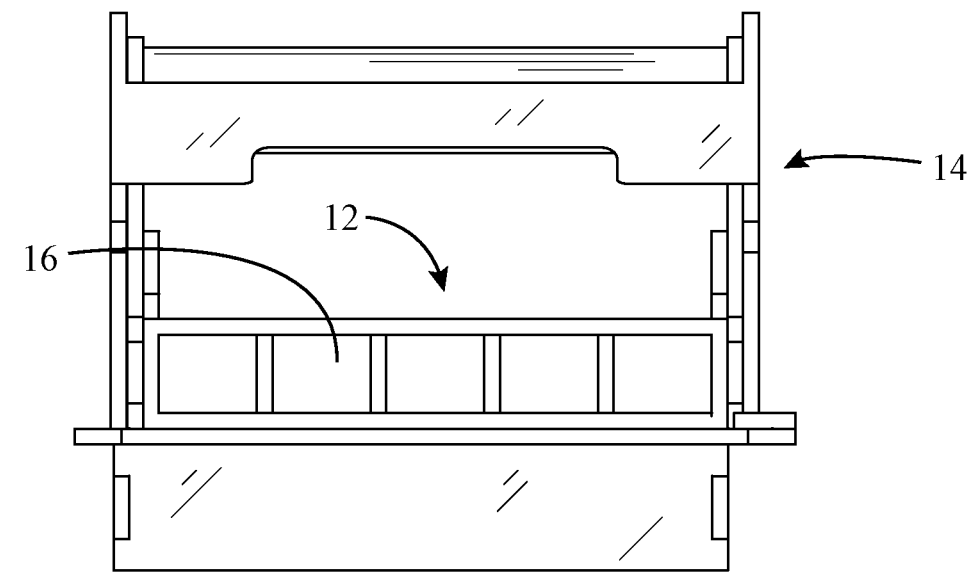
FIG. 5 is a left-side elevation view of the version shown in FIG. 1.
Figure 25:
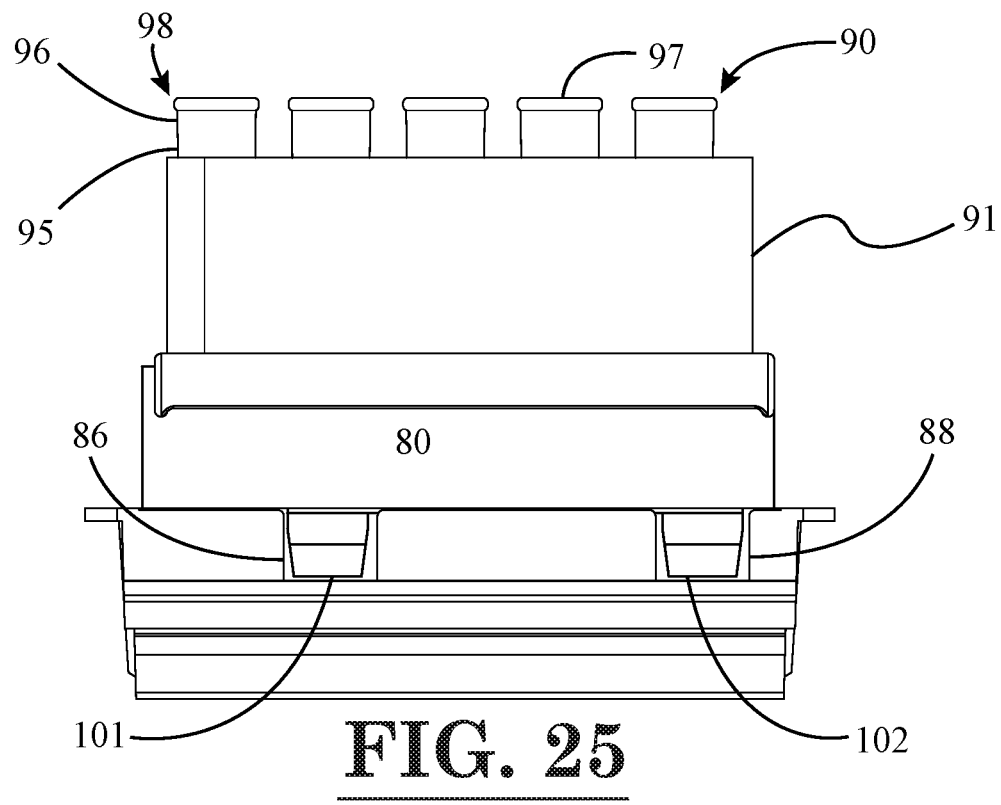
FIG. 25 is a side elevation view of the first tray showing the lateral slots adapted to receive the analyzer tray outcroppings.

Referring to FIG. 25 and FIG. 26, typically, each test tube 90 comprises a body 95 and a top portion 96, wherein the body 95 generally has a constant diameter and the top portion 96 terminates at an upper rim 97 and flared lip 98 extending about the upper rim 97. The upper rim 97 portion and flared lip 98 provide a greater diameter than the body 95 diameter. However, in other versions, test tubes 90 may not have a flared lip 98 and are not required regarding proper function of the test tube removal device 10. FIG. 1 is an illustrative perspective view of a version of the test tube removal device 10. The version of the test tube removal device 10 generally comprises a test tube extraction assembly 12, a frame housing 30 and a cam assembly 14. The cam assembly 14 includes one or more cams 26 which when biased against the frame housing 30 operate to move the extraction assembly from a first position to a raised position, thereby simultaneously removing the test tubes 90 from the plurality of racks 91.

Figure 7:
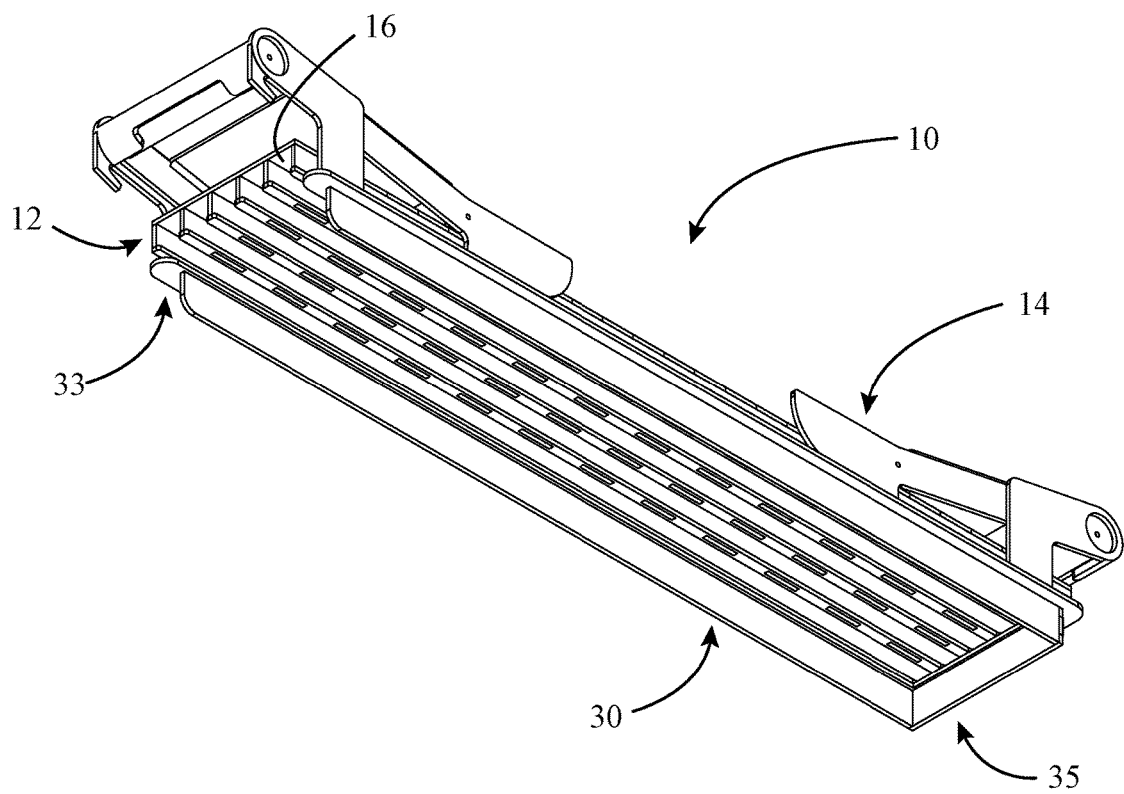
FIG. 7 is a rear, bottom perspective view of the version shown in FIG. 1.
Figure 8:
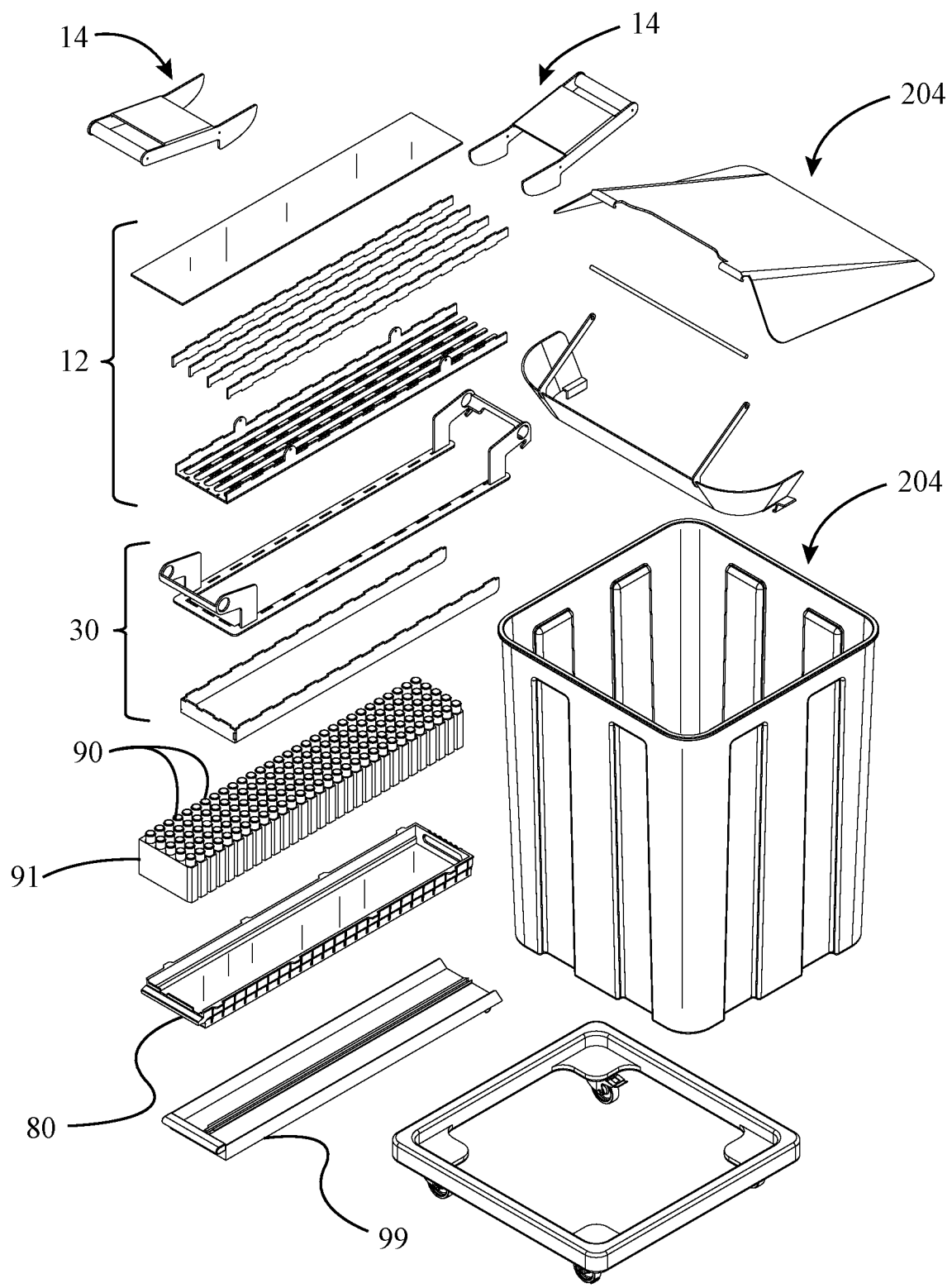
FIG. 8 is a disassembled, perspective view of the version shown in FIG. 1 utilized in combination as a system.

As best illustrated by FIG. 7, the frame housing 30 is configured to couple with the top plan footprint of the plurality of racks 90 defined by the opposing longitudinal shoulders 72a, 72b as well as provide support for the test tube extraction assembly 12 and the cam assembly 14. In further detail, the frame housing 30 is operably configured and positioned to provide a fixed surface for biasing one or more cams 26 as they are rotated between the default, first position and the raised position.

In the illustrated version, the frame housing 30 forms a rectangular framework which is open at a first end 33 and closed at the opposing second end 35. The frame housing 30 is configured to form a cap structure which fits around and over the collective top portions and opposing shoulders 70a, 70b (See FIG. 25) of the plurality of racks 91 while loaded in the rack carrier 80. Thus, substantially limiting the movement of the racks 91 and test tubes 90 while providing a plurality of biasing surfaces 32 for biasing each pair of cams 20, 22 throughout their path of motion. In the illustrated version, the frame housing 30 includes a first and second opposing laterally parallel static biasing surfaces 32a, 32b (See FIG. 3) The frame housing 30 is constructed to provide an operable space between a first biasing surface 32a and a second biasing surface 32b for movement of the extraction assembly 12 throughout the path of motion.

With reference to FIG. 1, the cam assembly 14 is operably coupled to the extraction assembly 12 for leveraging and moving the extraction assembly 12 between a default, first portion and a raised position. Thus, in the version, the extraction assembly 12 is configured to engage with the top portion 96 of each of the plurality of test tubes 90 by way of a means for gripping, and the cam assembly 14 is configured to separate and remove simultaneously the test tubes 90 from each respective rack slots 92 by way of linear motion. Other ways of engagement with the test tubes 90 can certainly be envisioned, such as by way of a friction type fit about each test tube top portion 96 outer surface—and thus a flared lip 98 would not be required.

Figure 11:
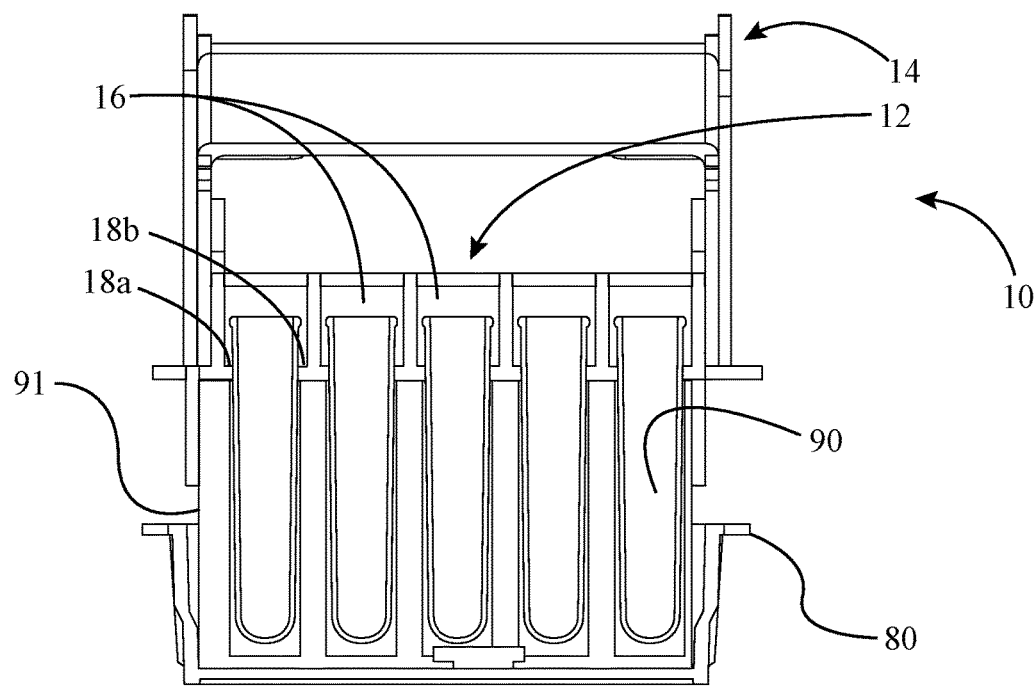
FIG. 11 is a cross section view taken along lines A-A of FIG. 9.

In a detailed version of the application and with reference to FIG. 9-FIG. 11, the extraction assembly 12 includes opposing transverse sides 76, 78 defining a length therebetween and generally includes one or more longitudinal slots 16 operably configured to receive and longitudinally slide over the top portion 96 (FIG. 10) of each test tube 90 which form one or more longitudinal rows. Preferably, each longitudinal slot 16 is closed at a first end 78 and opened at a second end 76. As best shown in FIG. 11, each of the longitudinal slots 16 include laterally spaced and longitudinally extending and interior rims 18a, 18b. Ideally, the lateral distance between the rims 18a, 18b is operably configured to be greater than the diameter of the body 95 of each test tube 90 and less than the diameter of the test tube 90 top portion 96 upper rim 97. Thus, during operation the means for gripping or the or the interior rims 18a, 18b of each longitudinal slot 16 catch on the upper rim 97 of each test tube 90 in the respective longitudinal row as the extraction assembly 12 is moved from the default position to the raised position.

As best illustrated by FIG. 4-FIG. 9, the splash guard assembly 14 is operably coupled with the extraction assembly 12 to leverage and move the extraction assembly 12 between the default, first position and the raised, test tube 90 released position. In a version, the cam assembly 14 generally includes a first pair of rotatable laterally disposed cams 20 and opposing mirrored second pair of rotatable laterally disposed cams 22 for translating rotary motion into the linear motion of the extraction assembly 12. Each pair of cams 20, 22 are rotatably connected to the extraction assembly 12 framework, share an axis of rotation, and are connected to move uniformly together throughout their respective paths of motion. A lever 24 is operably connected to each cam 26 within each cam pair 20, 22 which is operably connected for providing leveraged rotation of each respective cam 26 about their axis. In the version, a movable handle 28 rigidly connects the distal ends of the opposing cam levers 24 within each cam pair 20, 22 in order to provide simultaneous rotation of the cams 26 while providing a movable handle 28 during operation.

Figure 6:
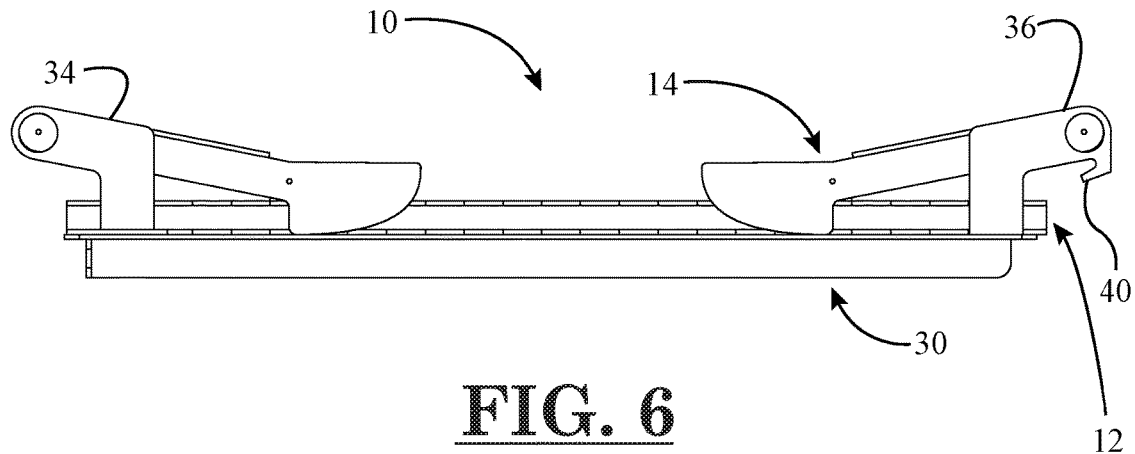
FIG. 6 is a front elevation view of the version shown in FIG. 1.

As shown in FIG. 6, each pair of cams 20, 22 are operably attached to the extraction assembly 12 at their respective axis of rotation X. Preferably, each axis of rotation X is positioned equidistant from midpoint M bisecting the length of the extraction assembly 12 and the respective end of the extraction assembly 12. This positioning of each respective cam 26 provides the greatest overall lifting power uniformly distributed amongst the test tubes 90.

Figure 16:
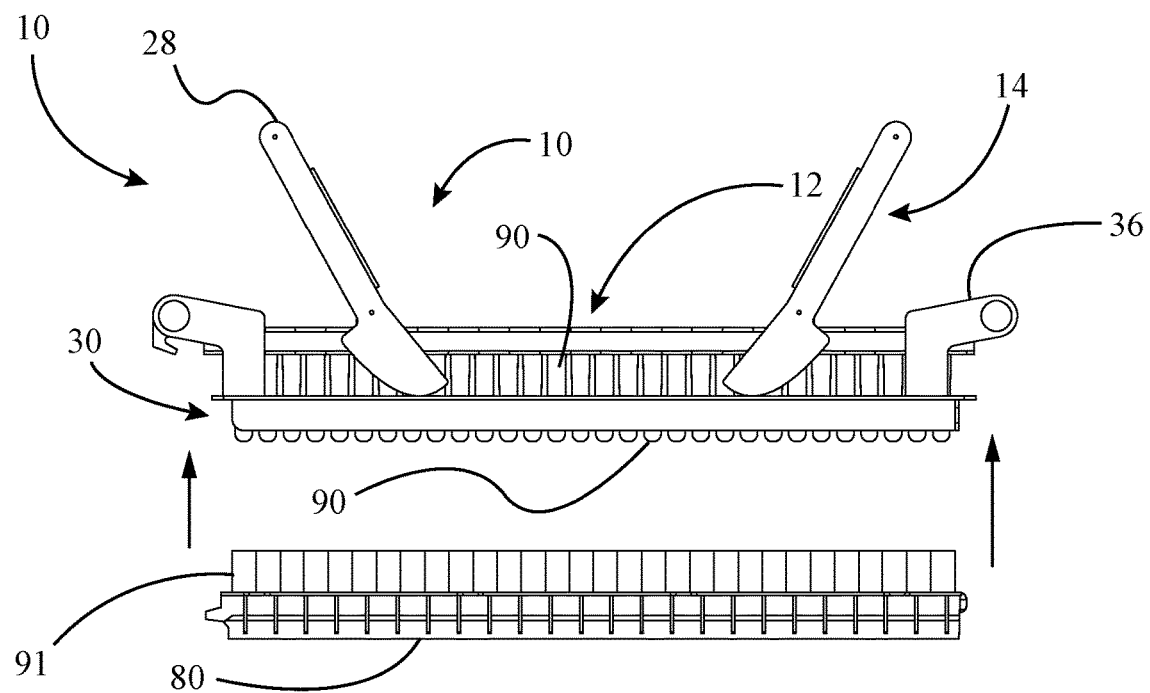
FIG. 16 is a diagram illustrating the test tube removal device after the sample extraction.

As best illustrated by FIG. 16, in a version of the application, the frame housing 30 may further comprise a pair of fixed position or static handles 34, 36 which are statically affixed and mirrored at the opposing ends of the frame housing 30. The static handles 34, 36 are constructed to receive and nest the movable handles 28 while in the default position (See FIG. 9). Further, the static handles 34, 36 function to limit the path of motion of each respective movable handle 28 at the default, first position which is efficient for handling during transport. In the illustrated version, the fixed position handles 34, 36 are positioned and constructed to extend out of the path of motion of the extraction assembly 12. For example, the first and second static handles 28 are disposed longitudinally outward beyond the perimeter of the frame housing 30. Similarly, the first and second movable handles 28 are disposed longitudinally outward with respect to the extraction assembly 12. Thus, as the movable handles 28 are caused to move upward, the respective cam pairs 20, 22 are uniformly rotated and biased against the respective static biasing surfaces 32a, 32b, thereby moving the extraction assembly 12 from the default, first position to the raised position.

Figure 12:
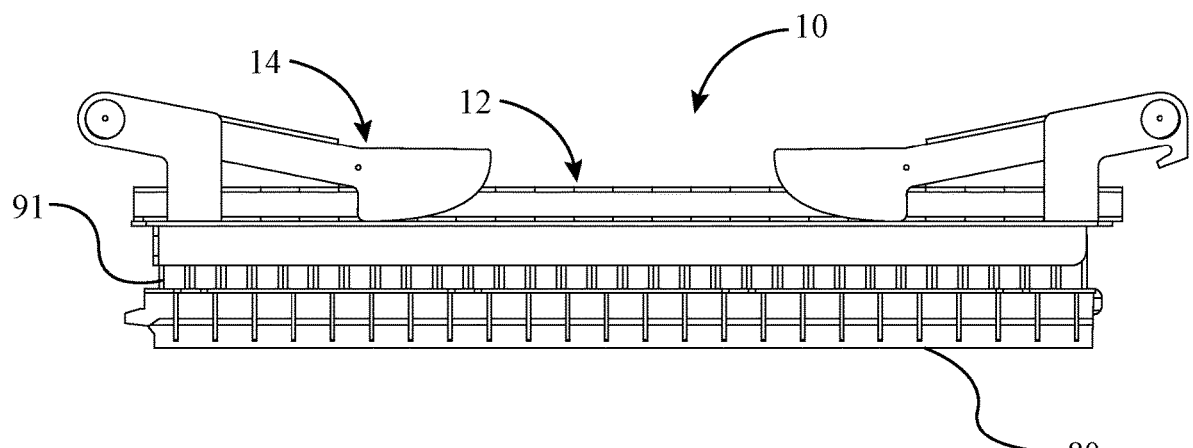
FIG. 12 is a front elevation view showing the version shown in FIG. 1 fully coupled with the racks and plurality of sample tubes.
Figure 24:
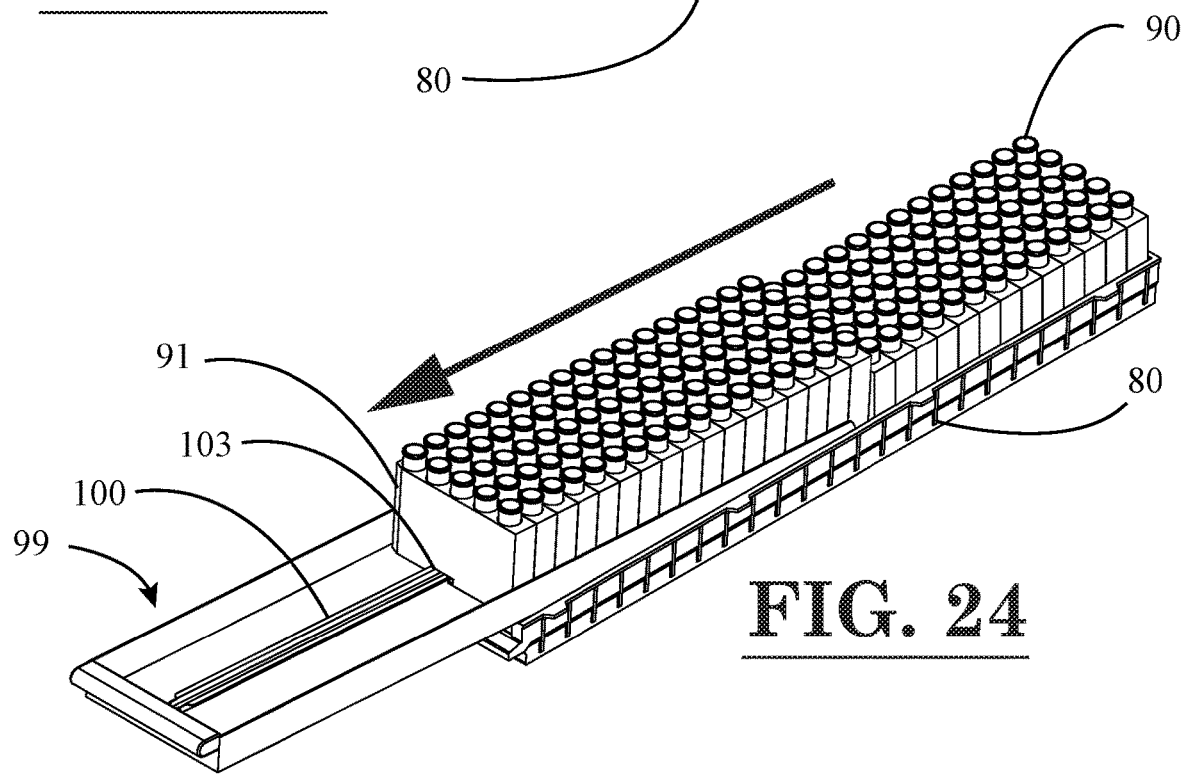
FIG. 24 is an illustrative view showing a plurality of racks containing used test tube for removal from the analyzer tray to the second tray.

Referring to FIG. 9-FIG. 17, operation of the test tube removal device 10 will now be described in detail. Firstly, a rack carrier 80 loaded with a plurality of racks 91 (See FIG. 24 and FIG. 26) is provided which boasts an array of contaminated test tubes 90 in the upright position as described above. FIG. 10 illustrates how the device 10 is longitudinally positioned and engaged over the upper portions 96 of the test tubes 90. Namely, the extraction assembly 12 which includes one or more longitudinal slots 16 aligns and coordinates with the longitudinal rows formed by the array of test tubes 90, positioning each test tube 90 rim 97 above the respective interior rims of the extraction assembly 12 and within each longitudinal slots 16 FIG. 11 illustrates a cross-section of the device 10 and extraction assembly 12 engaged with each longitudinal row of test tubes 90 by way of each longitudinal slot 16. FIG. 9 and FIG. 12 illustrate the device 10 and extraction assembly 12 while in the default position.

Figure 13:
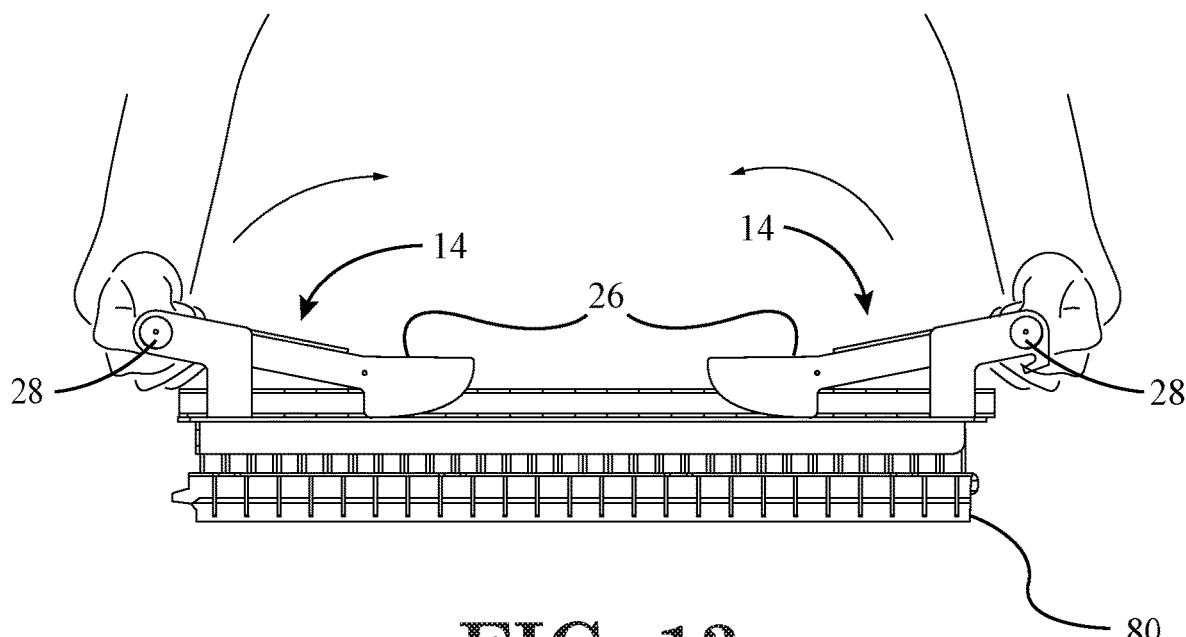
FIG. 13 is an illustrative front elevation view showing the version shown in FIG. 1 initiating sample tube extraction.
Figure 14:
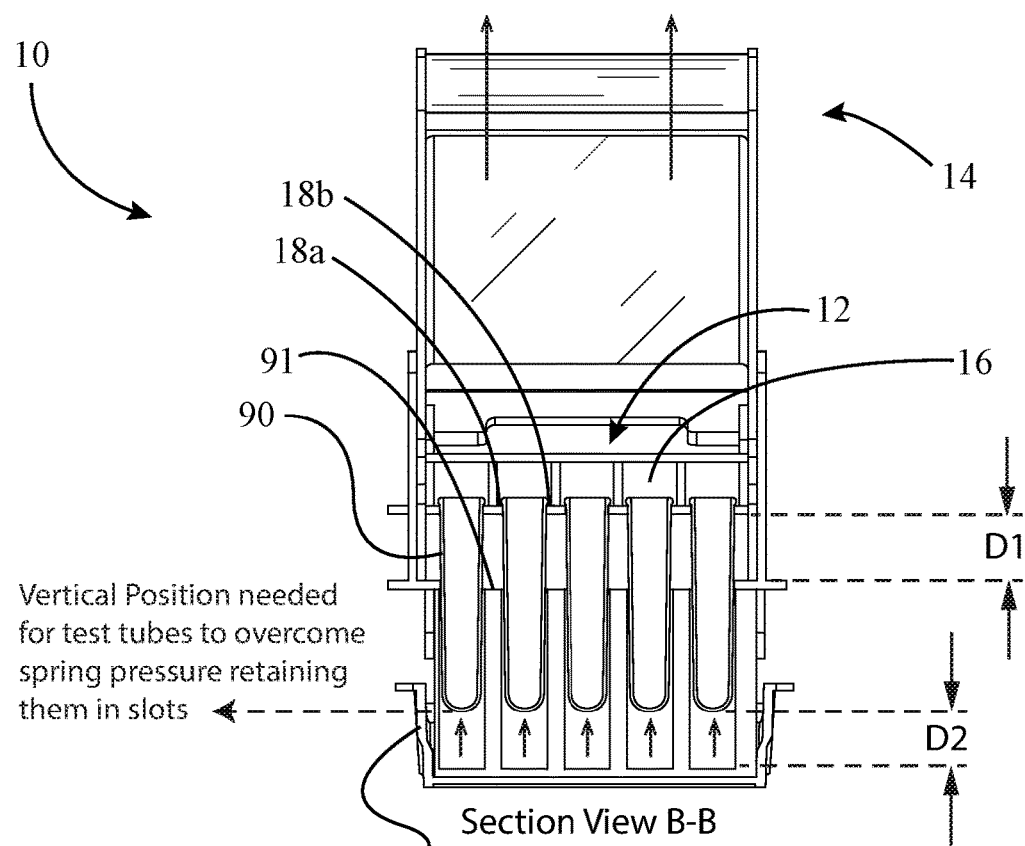
FIG. 14 is a cross section view taken along lines B-B of FIG. 9.
Figure 15A:
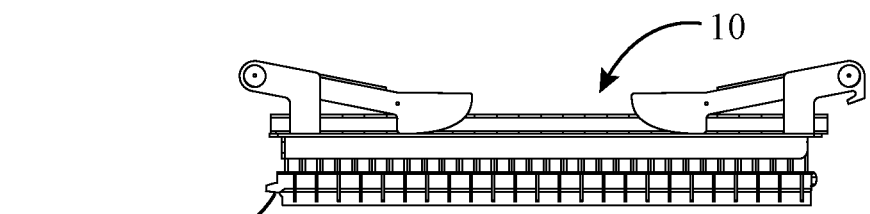
FIG. 15*a* is a diagram illustrating the operation and extraction method shown while in the first position.
Figure 15B:
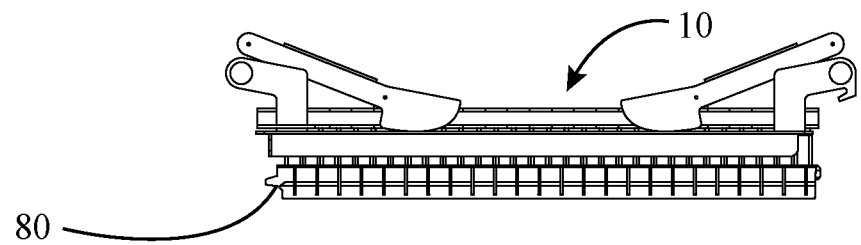
FIG. 15b is a diagram illustrating the operation and extraction method shown between the first position and the raised position.
Figure 15C:
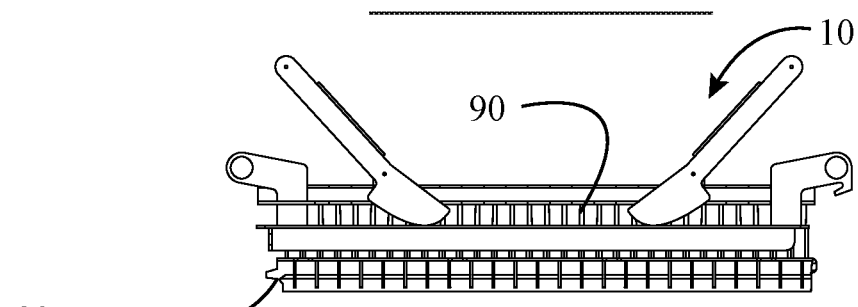
FIG. 15c is a diagram illustrating the operation and extraction method shown between the first position and the raised position.
Figure 15D:
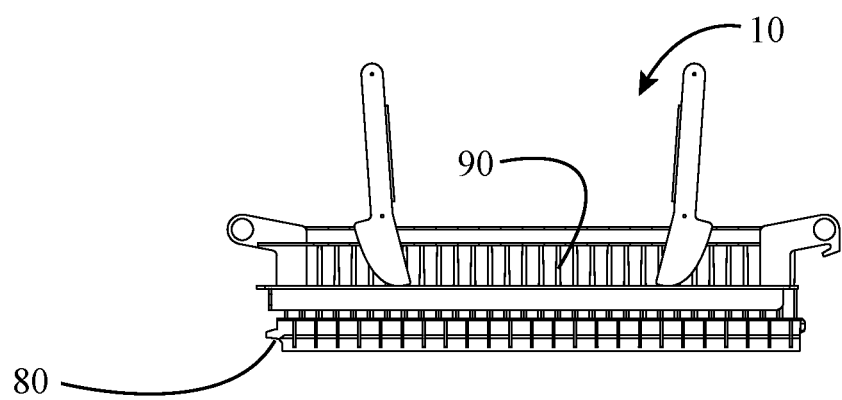
FIG. 15d is a diagram illustrating the operation and extraction method shown while in the raised position.

Referring to FIG. 13-FIG. 15, the device 10 is shown to move through a path of motion from the default position (FIG. 15a) to the raised, extracted position (FIG. 15d). As illustrated by FIG. 13, the operator actuates the cam assembly 14 by grasping the opposing first and second movable handles 28 and rotating inward, thereby translating the rotational movement of the cams 26 into the linear upward movement of the extraction assembly 12. Throughout the movement of the extraction assembly 12 from the default, first position to the raised, extracted position, the rims 18a, 18b catch on the upper rim 97 of each test tube 90 within the longitudinal slot 16, thereby lifting the plurality of test tubes 90 simultaneously (FIG. 15c and FIG. 15d). The test tubes 90 are lifted a distance D1 (FIG. 14) which should be greater than the distance D2 between the bottom 89 of the cylindrical slot 92 of each rack 91 and the point of release from the means of retention 94. Once the bottom of each test tube 90 body 95 has cleared the means of retention 94 for each slot 92, the plurality of test tubes 90 are released from the plurality of the racks 91 within the rack carrier 80 (See FIG. 16). Thereafter, the test tubes 90 can be collectively transported to a biohazard receptacle by sloping the removal device 10 which is described further below.

Figure 17:
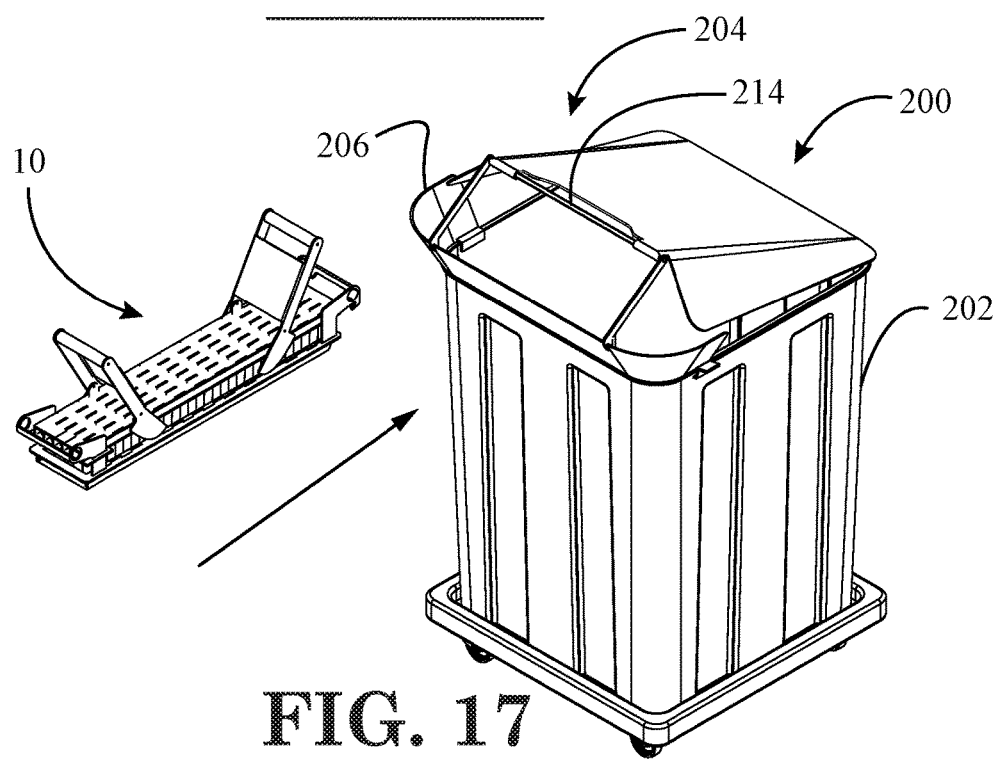
FIG. 17 is a diagram illustrating the test tube removal device with extracted sample tubes ready to be discarded.
Figure 18A:
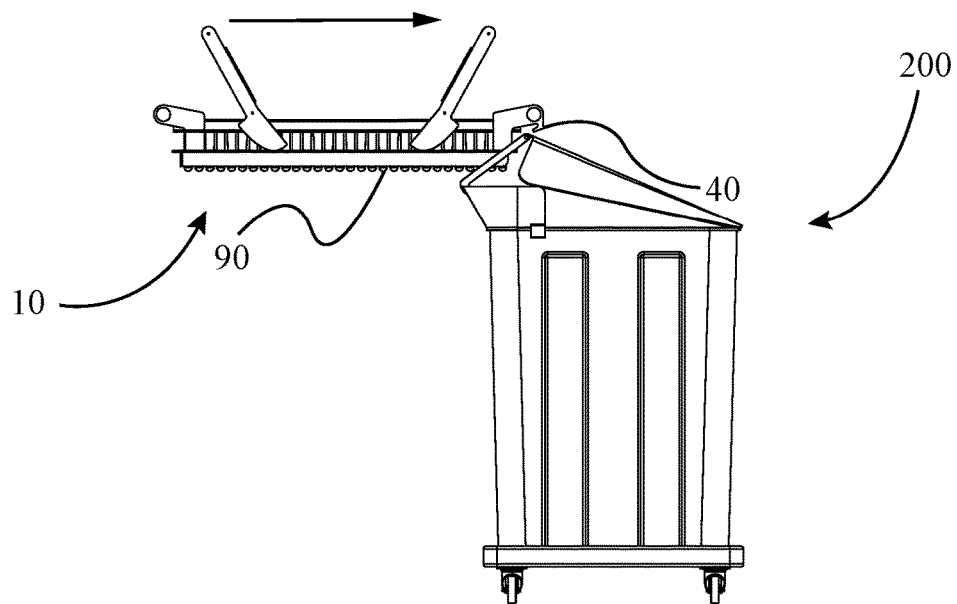
FIG. 18a is a diagram illustrating a version of the test tube removal device and system before attachment to a version of the waste receptacle.
Figure 18B:
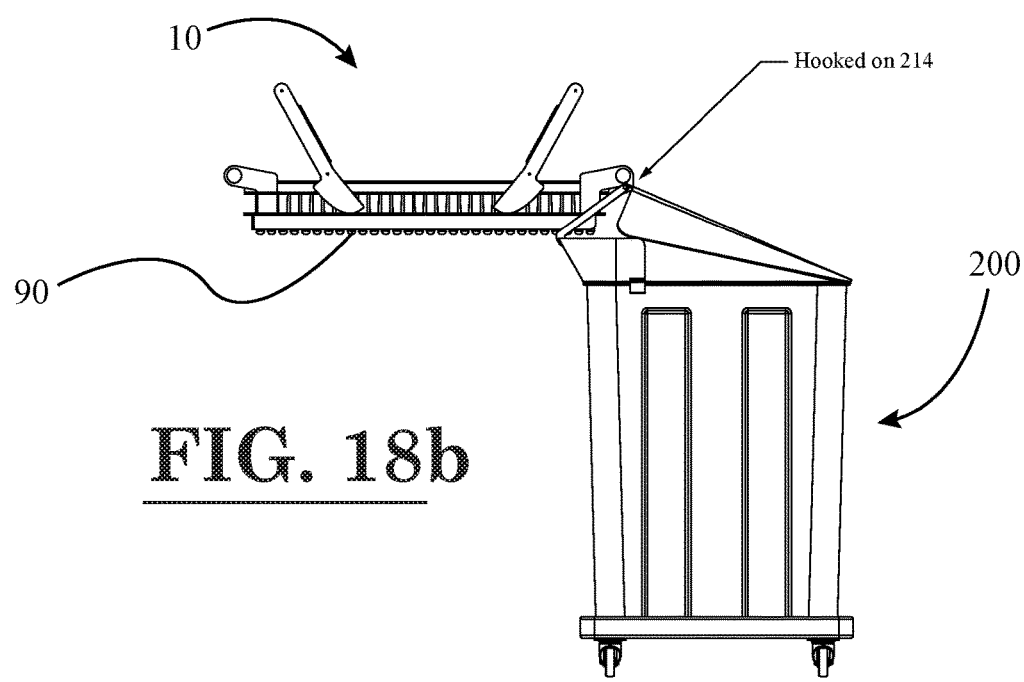
FIG. 18b is a diagram illustrating a version of the test tube removal device and system attached to the version of the waste receptacle.

In alternative embodiments, auxiliary devices may be utilized to work in conjunction with the removal device 10 as a system. For example, FIG. 17-FIG. 19 illustrate a uniquely configured receptacle 200 for disposing of the test tubes 90 after extraction which is tailored to work in conjunction with the removal device 10. As best illustrated by FIG. 17, the receptacle 200 generally comprises container 202 for receipt and storing of discarded test tubes 90 and a splash guard 204 for assisting in safely channeling test tubes 90 released from the removal device 10.

Figure 19A:
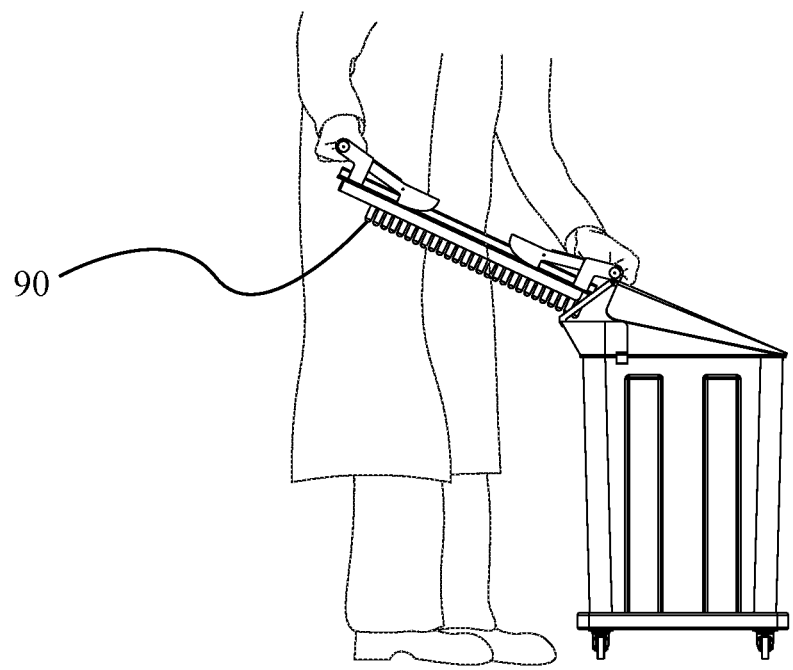
FIG. 19a is a diagram illustrating a version of the test tube removal device and system shown before release of sample test tubes into waste receptacle.
Figure 19B:
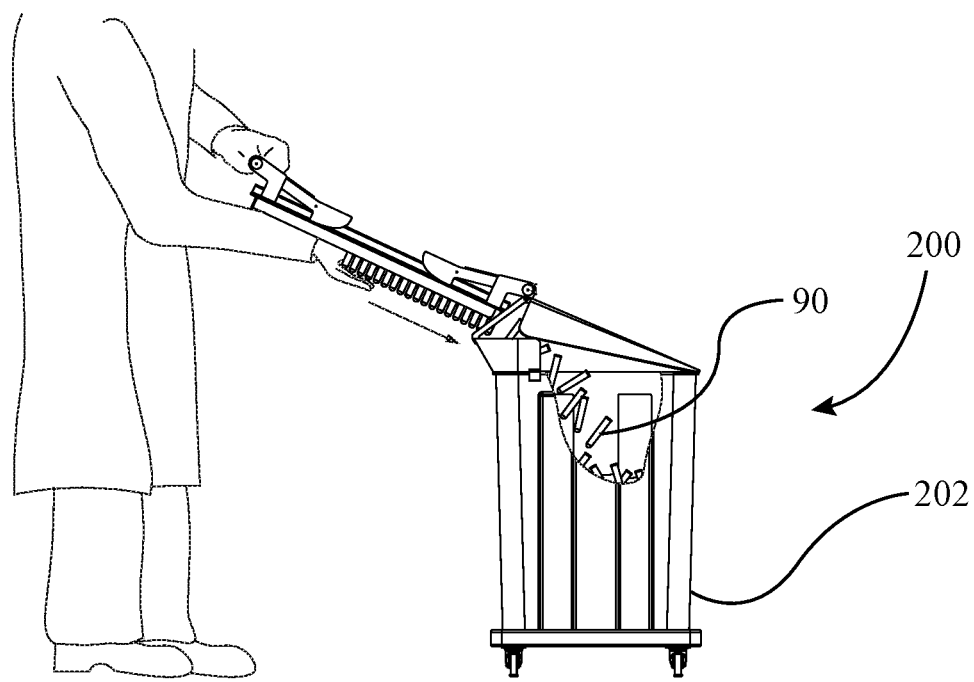
FIG. 19b is a diagram illustrating a version of the test tube removal device and system shown while releasing the sample tubes into the waste receptacle.
Figure 20:
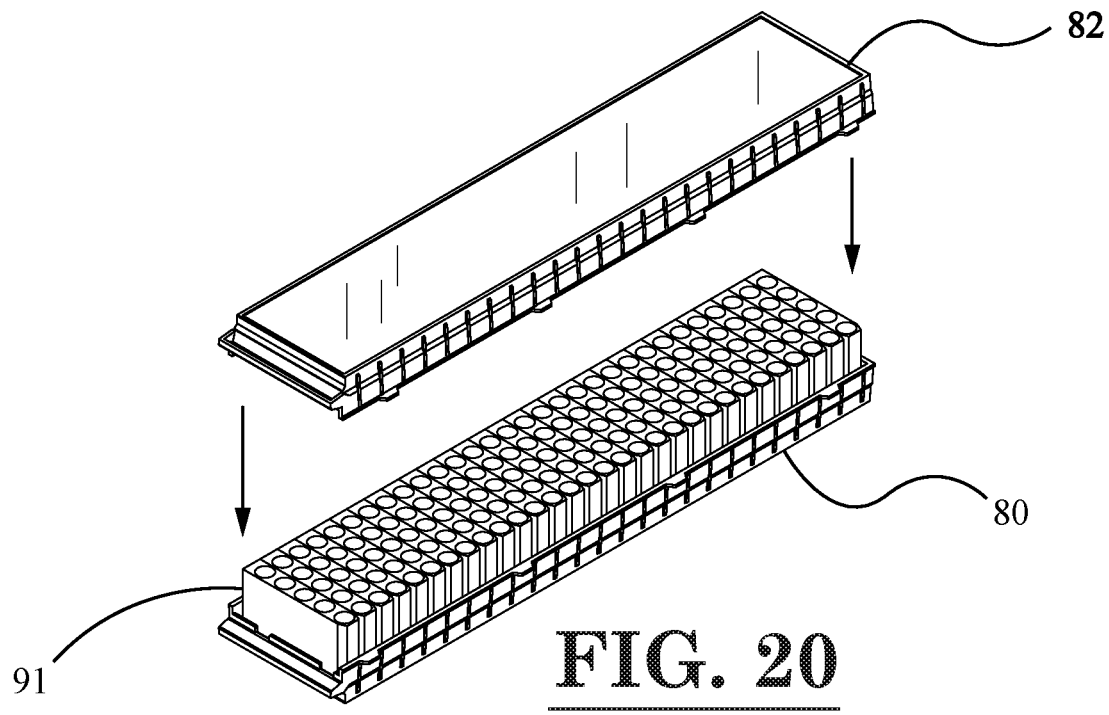
FIG. 20 is a front perspective view of a version of the test tube removal device and system further including a first and second tray for inverting the plurality of racks.

In a version, the funnel assembly 204 generally comprises a front plash guard 206 and an upper hood portion 208. The front splash guard 206 extends upward from the front top perimeter 207 of the container 202 and wraps partially around the sides thereof. The upper hood portion 208 extends forward from the rear and has sides 210, 212. Collectively, the splash guard 206 and the upper hood 208 form a gap 209 for receipt and channeling of the test tubes 90 directly from the removal device 10. In certain versions, the forward extending upper hood 208 terminates with an exposed removal device 10 lateral support rod 214 designed to couple with the removal device 10 while discarding the test tubes 90 into the waste receptacle 200. In the illustrated version, the removal device 10 further comprises a means for attaching to the support rod 214. In the illustrated version, the means for attaching is a fixed position handle 36 which incorporates a pair of laterally disposed hooks 40 which are operably configured to latch with the lateral support rod 214 (See FIG. 18a and FIG. 18b). As best shown in FIG. 19a and FIG. 19b, after the removal device 10 hooks 40 are coupled with the support rod 214, the opposing end is lifted upward which creates a slope within the one or more longitudinal slots 16 of the extraction assembly 12. Naturally, the plurality of the test tubes 90 slide uniformly down each longitudinal slot 16 and safely fall without splash back into the receptacle 200.

Figure 21:
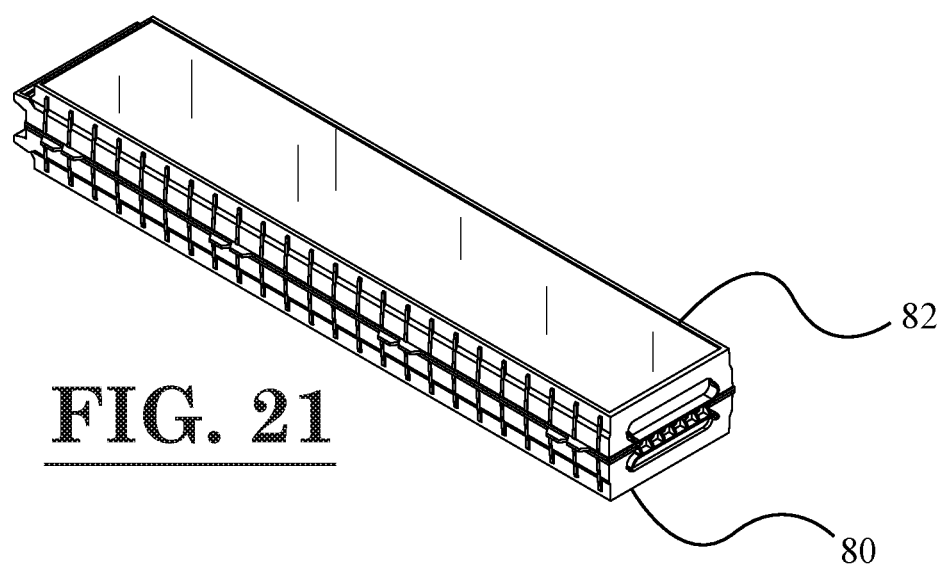
FIG. 21 is a rear perspective view of the first and second trays encapsulating the plurality of test tube racks as shown in FIG. 20.
Figure 22A:
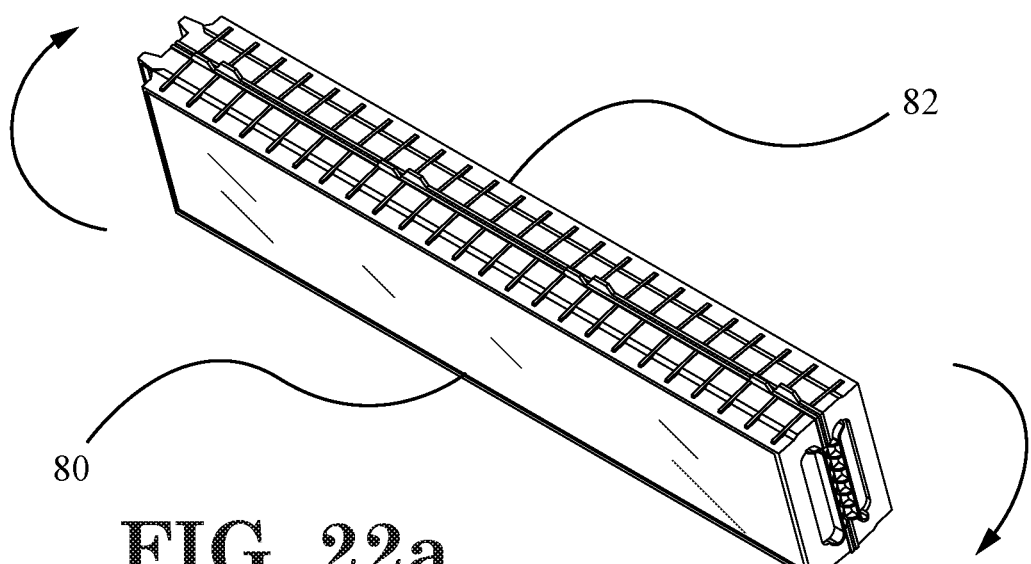
FIG. 22a is an illustrative view of the version shown in FIG. 21 as the plurality of racks are inverted.
Figure 22B:
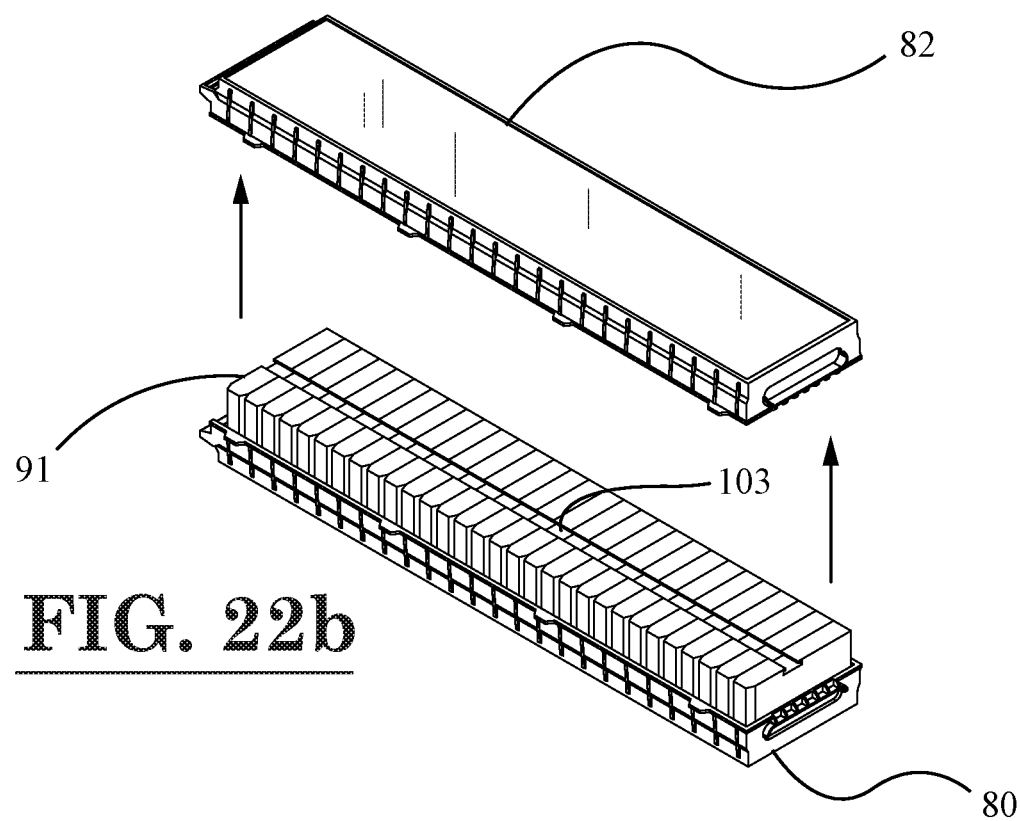
FIG. 22b is an illustrative view of the version shown in FIG. 22a removing the second tray from the racks.
Figure 23:
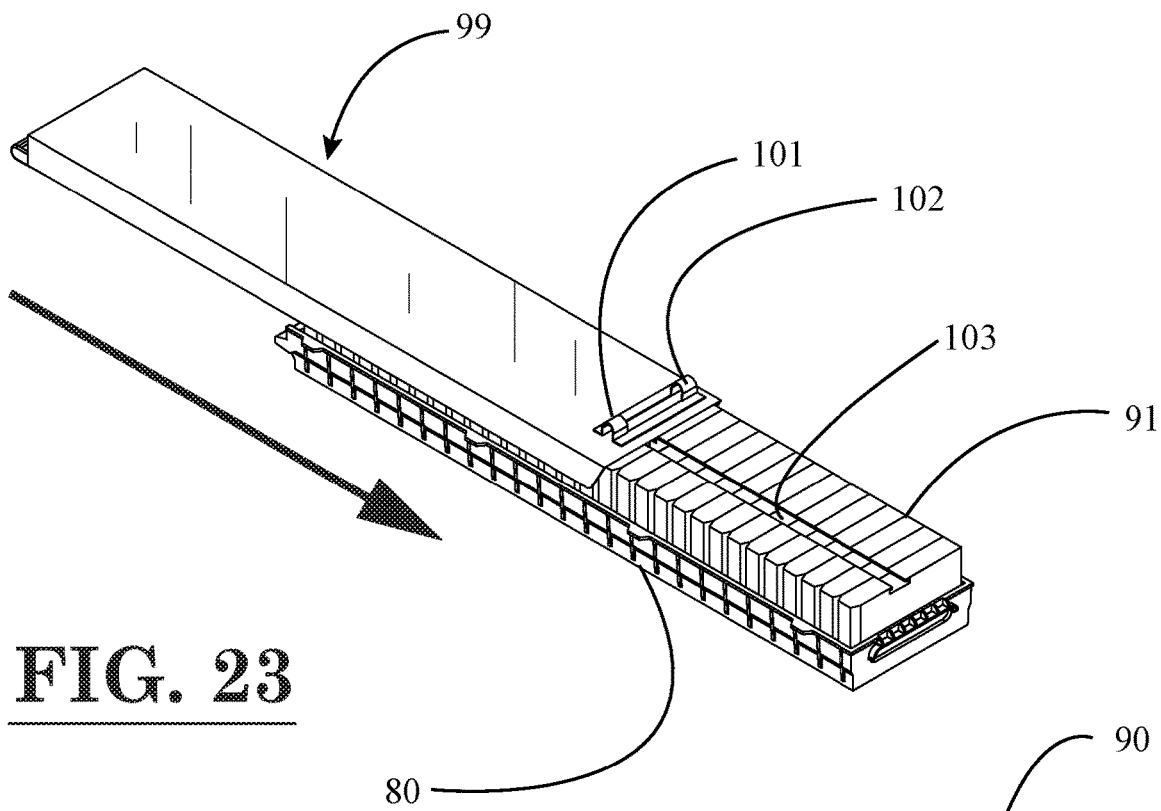
FIG. 23 is an illustrative view of the analyzer tray engaging the inverted racks while seated in the first tray.

Referring to FIG. 20-FIG. 27, certain versions of the system may include a first and second rack carrier 80, 82 for purposes of inverting the empty plurality of racks 91 in order to load them on an analyzer tray 99 which is customary in the field of analyzer machines (See FIG. 23). Inverting the racks 91 by using only a first rack carrier 80 is time consuming and daunting. Therefore, a unique supplemental second rack carrier 82 is provided in order to easily rotate the plurality of racks 91 into the desired inverted position for loading. In a version, the second rack carrier 82 is placed on top of the empty racks 91 as illustrated by FIG. 21. The rack carriers 80, 82 each comprise opposing end handles 84 which form a unitary handle once both encapsulate the racks 91. Thereafter, the operator can easily rotate or flip over the racks 91 into an inverted position as shown by FIGS. 22a and 22b exposing the composite rack slot 103 adapted to receive the analyzer tray 99 rail 100 for loading.

As illustrated by FIG. 25, in the version, the rack carriers 80, 82 may further comprise forward lateral notches 86, 88 strategically positioned for receiving loaded racks 91 from an analyzer tray 99 which customarily have lower extending outcrops 101, 102.

Figure 28:
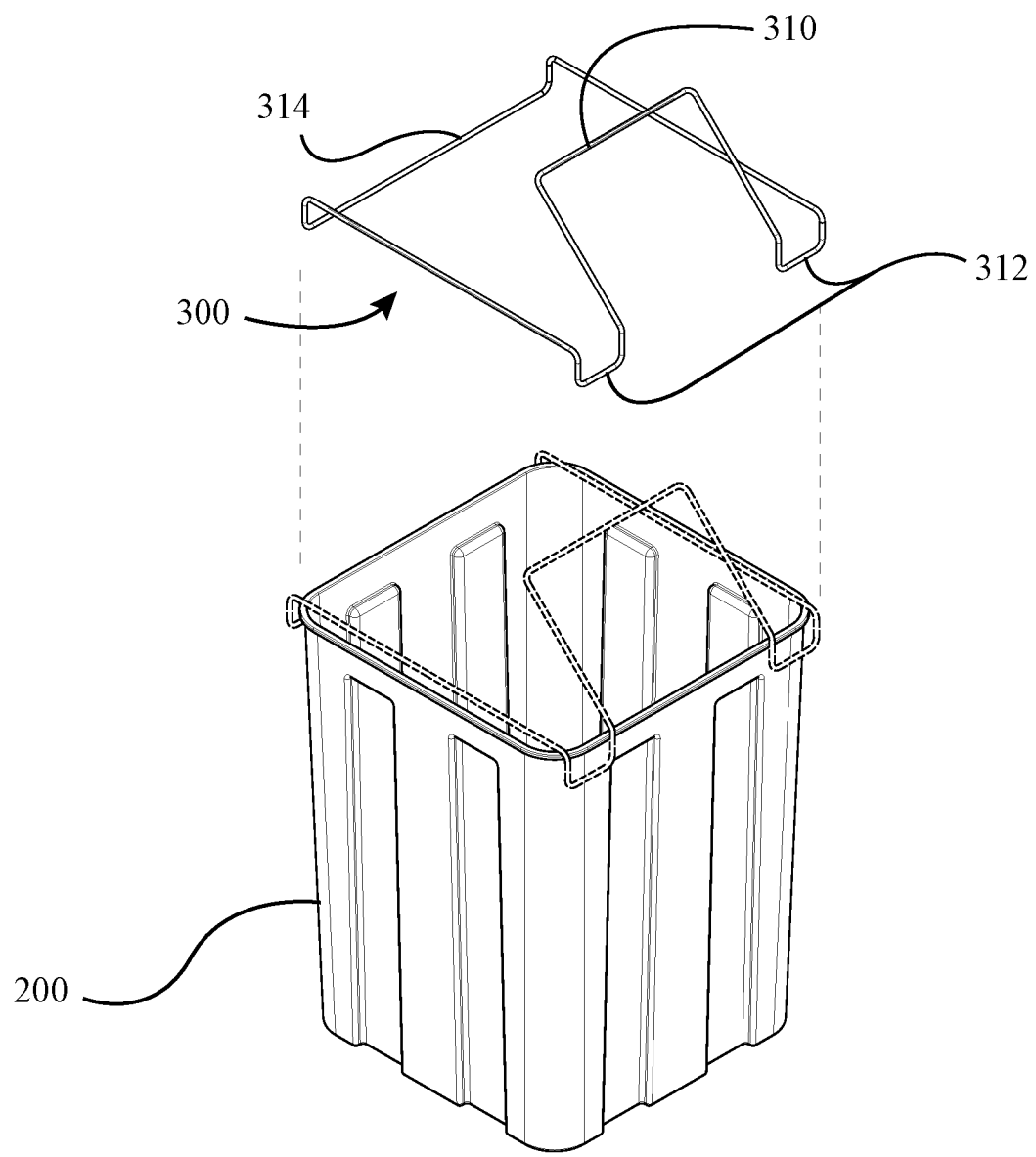
FIG. 28 is an illustrative diagram showing an alternative version of the waste receptacle upper hood continuous wire framework.

FIG. 28 illustrates an alternative embodiment in that the waste receptacle 200 funnel assembly 204 can be structured with a continuous wired frame 300. The continuous wired frame 300 may include a rear attachment member 314 and a front attachment members 312 which act together to attach the frame 300 to the top perimeter 209 of the waste receptacle 200. Moreover, the wired frame 300 integrally includes the lateral support rod 310 for attachment to the test tube removal device 10.

Figure 29A:
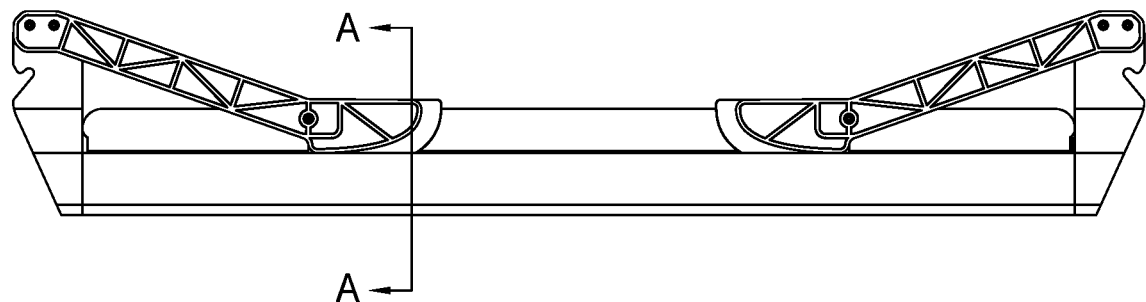
FIG. 29a is a front side elevation view showing an alternative version of the test tube removal device.
Figure 29B:
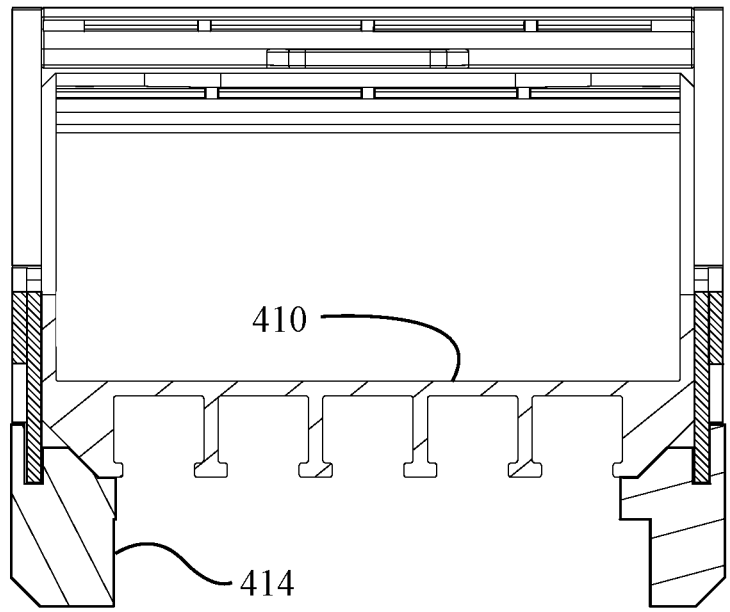
FIG. 29b is a cross-sectional view of example details of the version shown in FIG. 29a taken along the lines A-A.

FIG. 29a and FIG. 29b illustrate an alternative cam assembly 414 which generally provides frame housing 430 with one or more biasing surfaces 432 formed within a channel 450. Essentially, the bottom surface of each channel 450 provides the biasing surface 432 of each respective cam 426. This configuration aids in better alignment of the test tube removal device 410 throughout the operating range of motion. Moreover, in the version, the extraction assembly 412 and the frame housing 430 boast sloped transverse ends 476, 478.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure.

What is claimed is:

1. A test tube removal device for extracting a plurality of test tubes from one or more aligned racks having opposing longitudinal shoulders and form together one or more longitudinal rows of aligned test tubes, the test tubes having a top portion having a lip having a diameter and a body having a diameter, the device comprising:
   an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row;

a frame housing adapted to couple with the one or more racks, the frame housing including at least a first biasing surface; and a cam assembly operably attached to the extraction assembly for moving the extraction assembly between a first position and a raised position, the cam assembly including at least a first cam operably positioned proximate the first biasing surface and a lever operably attached to the first cam for providing rotary motion which translates to linear upward motion of the extraction assembly while moving from the first position to the raised position.

2. The device of claim 1, further comprising a first handle attached to the lever, wherein as the handle is caused to move upward, the cam is operably rotated and biased against the surface, thereby moving the extraction assembly from the first position to the raised position.

3. The device of claim 2, further comprising a first and second static handles positioned at each opposing end of the frame housing.

4. The device of claim 3, wherein at least one of the first and second static handles is adapted to nest and limit the path of motion of the movable handle while in the first position.

5. The device of claim 4, wherein the first and second static handles are disposed longitudinally outward beyond the perimeter the frame housing.

6. The device of claim 5, wherein the frame housing is formed of a rectangular framework open at a first end, the rectangular framework sized to receive and seat with the opposing longitudinal shoulders formed by the one or more aligned racks.

7. The device of claim 1, wherein the frame housing is formed of a rectangular framework open at a first end, the rectangular framework sized to receive and seat with the opposing longitudinal shoulders formed by the one or more aligned racks.

8. A test tube removal device for extracting a plurality of test tubes from one or more racks having opposing shoulders and form together one or more longitudinal rows of aligned test tubes, the test tubes having a top portion having a lip having a diameter and a body having a diameter, the device comprising:

an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row;

a frame housing adapted to couple with the one or more racks, the frame housing including a first and second opposing laterally parallel biasing surfaces; and a cam assembly operably attached to the extraction assembly for moving the extraction assembly between a first position and a raised position, the cam assembly including a first pair of laterally disposed cams and a second pair of laterally disposed cams, the first pair and the second pair of laterally disposed cams are rotatably attached at opposing sides of the extraction assembly, each pair of cams operably proximate with the first and second biasing surfaces respectively, a first and second pair of levers operably attached to the first and second pair of cams respectively providing rotary motion which translates to linear upward motion of the extraction assembly while moving from the first position to the raised position, and a first and second movable handle attaching each of the pair of levers together for providing uniform motion of each pair of cams between the first position and the raised position.

9. The device of claim 8, further comprising a first and second static handles positioned at each opposing ends of the frame housing.

10. The device of claim 9, wherein each of the first and second static handles are adapted to nest and limit the path of motion of the first and second movable handles respectively while in the first position.

11. The device of claim 8, wherein the first and second handles are disposed longitudinally outward with respect to the extraction assembly, wherein as the handles are caused to move upward, the respective cam pairs are uniformly rotated and biased against the respective surfaces, thereby moving the extraction assembly from the first position to the raised position.

12. The device of claim 11, further comprising a first and second static handles positioned at each opposing ends of the frame housing, wherein the first and second static handles are disposed longitudinally outward beyond the perimeter of the frame housing.

13. The device of claim 12, wherein each of the first and second static handles are adapted to nest and limit the path of motion of the first and second movable handles respectively while in the first position.

14. The device of claim 13, wherein the frame housing is formed of a rectangular framework open at a first end, the rectangular framework sized to receive and couple with the opposing longitudinal shoulders formed by the aligned one or more racks.

15. The device of claim 8, wherein the frame housing is formed of a rectangular framework open at a first end, the rectangular framework sized to receive and seat with the opposing longitudinal shoulders formed by the aligned one or more racks.

16. A system for extracting and disposing of a plurality of test tubes from one or more aligned racks having opposing longitudinal shoulders and form together one or more longitudinal rows of aligned test tubes, the test tubes having a top portion having a lip having a diameter and a body having a diameter, the system comprising:

a device comprising:

an extraction assembly including one or more longitudinal slots adapted to receive and slide over the top portion of each test tube forming the longitudinal row, each longitudinal slot comprising laterally spaced and longitudinally extending interior rims, the lateral distance between the rims being greater than the diameter of the body of the test tube and less than the diameter of the test tube top portion flared lip, thereby during operation the interior rims grasp each test tube in the respective longitudinal row;

a frame housing adapted to couple with the one or more racks, the frame housing including at least a first biasing surface; and a cam assembly operably attached to the extraction assembly for moving the extraction assembly between a first position and a raised position, the cam assembly including at least a first cam operably positioned proximate the first biasing surface and a lever operably attached to the first cam for providing rotary motion which translates to linear upward motion of the extraction assembly while moving from the first position to the raised position; and a receptacle comprising a container for receipt and storage of discarded test tubes, the container having a top perimeter, and a funnel assembly including a front splash guard and an upper hood portion.

17. The system of claim 16, wherein the funnel assembly front splash guard extends upward and forward of the top perimeter and the upper hood portion extends from the rear of the container, collectively the splash guard and the upper hood form a gap for receipt and channeling of the test tubes directly from the removal device.

18. The system of claim 17, wherein the upper hood further comprises a laterally extending support rod and the device further comprises a pair of laterally disposed hooks which are operably configured to latch with the lateral support rod.

19. The system of claim 16, further comprising a first and second rack carrier, wherein each rack carrier comprises a flat base and opposing side walls extending upwards forming a rectangular container having a depth, wherein the depth is approximately half of the height of an upright rack.

* * * * *